United States Patent
Tanji

(10) Patent No.: US 12,552,082 B2
(45) Date of Patent: Feb. 17, 2026

(54) RESIN RESIDUE REMOVAL DEVICE

(71) Applicant: KYORAKU CO., LTD., Kyoto (JP)

(72) Inventor: Tadatoshi Tanji, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 357 days.

(21) Appl. No.: 18/262,032

(22) PCT Filed: Jan. 19, 2022

(86) PCT No.: PCT/JP2022/001742
§ 371 (c)(1),
(2) Date: Jul. 19, 2023

(87) PCT Pub. No.: WO2022/158479
PCT Pub. Date: Jul. 28, 2022

(65) Prior Publication Data
US 2024/0109238 A1 Apr. 4, 2024

(30) Foreign Application Priority Data

Jan. 25, 2021 (JP) ................................ 2021-009650
Apr. 30, 2021 (JP) ................................ 2021-078004
Sep. 17, 2021 (JP) ................................ 2021-152498

(51) Int. Cl.
*B29C 49/42* (2006.01)
*B29C 33/72* (2006.01)
(Continued)

(52) U.S. Cl.
CPC ........ *B29C 49/42403* (2022.05); *B29C 33/72* (2013.01); *B29C 35/16* (2013.01); *B29C 37/00* (2013.01); *B29C 49/04* (2013.01)

(58) Field of Classification Search
CPC .................... B29C 49/42403; B29C 2033/727
See application file for complete search history.

(56) References Cited

U.S. PATENT DOCUMENTS

2014/0103559 A1* 4/2014 Keusch ................. B29C 48/272
425/441

FOREIGN PATENT DOCUMENTS

| JP | 2010214815 A | 9/2010 |
| JP | 2014520005 A | 8/2014 |

(Continued)

OTHER PUBLICATIONS

International Search Report issued on Mar. 22, 2022, in corresponding International Application No. PCT/JP2022/001742; 4 pages.

*Primary Examiner* — Virak Nguon
(74) *Attorney, Agent, or Firm* — Maier & Maier, PLLC

(57) ABSTRACT

A resin residue removal device is provided that is capable of appropriately removing a resin residue adhered to a lower surface of a die of a molding apparatus. The present invention provides a resin residue removal device for removing a resin residue adhered to a lower surface of a die of a molding apparatus, the device including a moving mechanism and a resin residue removal head, wherein the moving mechanism is configured to move the resin residue removal head between a lateral position out of a position immediately below the die and an immediately below position as the position immediately below, and also in the immediately below position, to move the head between a separate position separate from the lower surface and a close position close to the lower surface, and the resin residue removal head is configured to allow removal of the resin residue adhered to the lower surface by moving along the lower surface.

14 Claims, 24 Drawing Sheets

(51) Int. Cl.
  *B29C 35/16* (2006.01)
  *B29C 37/00* (2006.01)
  *B29C 49/04* (2006.01)

(56) References Cited

FOREIGN PATENT DOCUMENTS

| | | | |
|---|---|---|---|
| JP | 2019098560 A | | 6/2019 |
| JP | 2020032610 A | * | 3/2020 |
| WO | 2021024982 A1 | | 2/2021 |

* cited by examiner

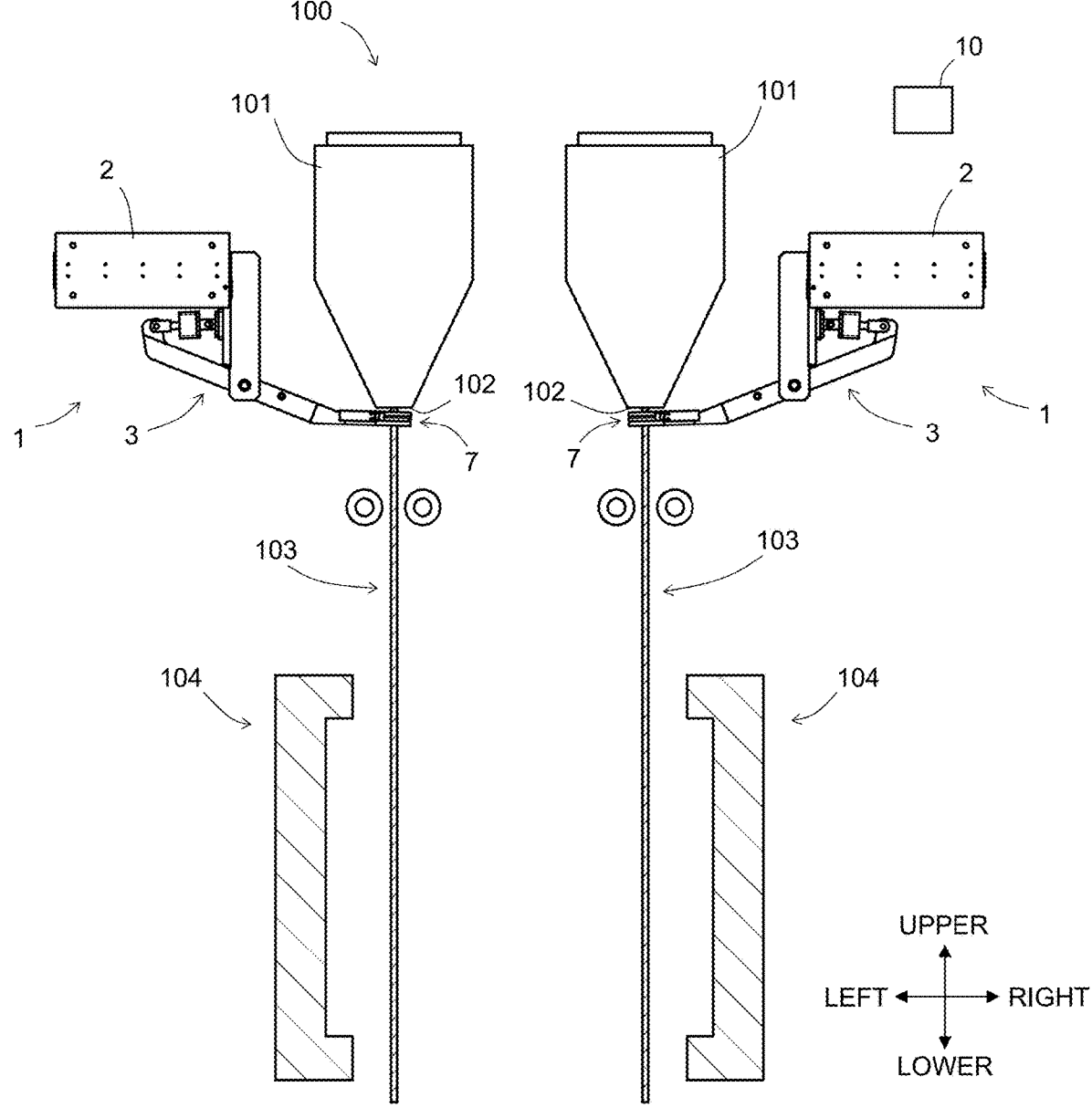

RESIN RESIDUE REMOVAL DEVICE

TECHNICAL FIELD

The present invention relates to a resin residue removal device for removing a resin residue adhered to a die of a molding apparatus.

BACKGROUND ART

There are techniques to produce molded articles in the past by blow molding a parison extruded from a molding apparatus. For example, PTL 1 discloses a method of obtaining a hollow molded article by extruding a cylindrical parison from a slit formed in a die (dies) of a molding apparatus for hanging and blow molding in a mold. In addition, PTL 2 discloses a method of producing a resin panel by extruding resin sheets from T dies of a pair of molding apparatuses for hanging and closing by molds together with a core material.

CITATION LIST

Patent Literature

PTL 1: JP 2010-214815 A
PTL 2: JP 2019-098560 A

SUMMARY OF INVENTION

Technical Problem

Such a technique in the past, however, has a risk that, after a resin in a molten state is extruded from a slit of a die, the resin remains near the slit and is adhered to the molding apparatus as a resin residue to affect the molding.

The present invention has been made in view of such a situation and it is an object thereof to provide a resin residue removal device capable of appropriately removing a resin residue adhered to a lower surface of a die of a molding apparatus.

Solution to Problem

The present invention provides a resin residue removal device for removing a resin residue adhered to a lower surface of a die of a molding apparatus, the device including a moving mechanism and a resin residue removal head, wherein the moving mechanism is configured to move the resin residue removal head between a lateral position out of a position immediately below the die and an immediately below position as the position immediately below, and also in the immediately below position, to move the head between a separate position separate from the lower surface and a close position close to the lower surface, and the resin residue removal head is configured to allow removal of the resin residue adhered to the lower surface by moving along the lower surface.

The present invention allows removal of the resin adhered to the lower surface of the die without damaging the die because the moving mechanism is configured to cause the resin residue removal head to move respectively between the lateral position and the immediately below position and between the separate position and the close position.

Examples of various embodiments of the present invention are as follows. The embodiments below may be combined with each other.

It is preferred that the moving mechanism includes a support arm supporting the resin residue removal head on a distal end side of the arm and also includes at least one configuration of (1) or (2) below: (1) a configuration in which horizontal movement of the support arm causes the resin residue removal head to move between the lateral position and the immediately below position; or (2) a configuration in which seesaw pivoting of the support arm causes the resin residue removal head to move between the separate position and the close position.

It is preferred that the moving mechanism includes: a guide mechanism; a sliding member; and a linear drive mechanism, the support arm is supported by the sliding member, and sliding of the sliding member along the guide mechanism by driving of the linear drive mechanism causes the resin residue removal head to move between the immediately below position and the lateral position.

It is preferred that the guide mechanism extends to the die in the lateral position, and sliding of the sliding member along the guide mechanism by driving of the linear drive mechanism causes the support arm to move forward and backward and the resin residue removal head to move between the immediately below position and the lateral position.

It is preferred that the sliding member includes: a support shaft pivotally supporting the support arm; and a pressing section configured to press the support arm, the support arm includes a to-be-pressed section in a position opposite to the resin residue removal head across the support shaft, and when the support arm moves forward in association with sliding of the sliding member, a downward press of the to-be-pressed section from above by the pressing section causes the support arm to seesaw pivot about the support shaft.

It is preferred that the pressing section is a roller placed in a support frame supporting the guide mechanism, the to-be-pressed section is a cam having an upper surface tilted upward toward a rear end side of the support arm, and the forward movement of the support arm in association with sliding of the sliding member causes the roller to abut on the upper surface and to press the cam downward from above.

It is preferred that the molding apparatus is configured to extrude a cylindrical parison and has the die formed with an annular slit capable of extruding the cylindrical parison on the lower surface, the resin residue removal head includes a resin residue removal member and a removal drive mechanism, the resin residue removal member has a facing surface facing the lower surface, and by driving of the removal drive mechanism, the resin residue removal member rotates to allow the facing surface to move along the slit.

It is preferred that the resin residue removal member is a columnar member turnably supported.

It is preferred that the resin residue removal member is a removal blade having a cutting edge portion in a direction of the rotation.

It is preferred that the molding apparatus is configured to extrude a resin sheet in a sheet shape and has the die formed with a linear slit capable of extruding the resin sheet on the lower surface, the guide mechanism is arranged along a longitudinal direction of the slit, and the sliding of the sliding member along the guide mechanism by the driving of the linear drive mechanism causes the support arm to slide and the resin residue removal head to move between the lateral position and the immediately below position and to further move along the slit.

It is preferred that the sliding member includes a support shaft pivotally supporting the support arm, and the moving mechanism includes a pivot drive mechanism causes the support arm to seesaw pivot about the support shaft.

It is preferred that the resin residue removal device above further includes a control mechanism configured to control the moving mechanism, wherein the control mechanism causes the resin residue removal head to move to a farthest position from the lateral position in the immediately below position by the linear drive mechanism while the resin residue removal head is in the separate position, then causes the resin residue removal head to move to the close position by pivoting the support arm by the pivot drive mechanism, and then causes the resin residue removal head to move to the lateral position along the slit by the linear drive mechanism while the resin residue removal head is in the close position.

It is preferred that the resin residue removal device above further includes a cleaning mechanism configured to clean the resin residue adhered to the resin residue removal head.

It is preferred that the cleaning mechanism includes a cooling mechanism configured to cool the resin residue removal head.

It is preferred that the cleaning mechanism is a scraper configured to scrape the resin residue adhered to the resin residue removal head when the resin residue removal head moves to the lateral position.

It is preferred that the cleaning mechanism includes: a cleaning member configured to scrape the resin residue adhered to the resin residue removal head by moving along the resin residue removal head; and an air blowing mechanism configured to blow air to the cleaning member.

BRIEF DESCRIPTION OF DRAWINGS

FIG. 10 is a side view illustrating positional relationship between a resin residue removal device 1 according to a second embodiment of the present invention and a molding apparatus 100 that removes a resin residue using the device 1.

DESCRIPTION OF EMBODIMENTS

A description is given below to embodiments of the present invention. Various characteristics in the embodiments described below may be combined with each other. Each characteristic is independently inventive.

1. First Embodiment

Figure 1:
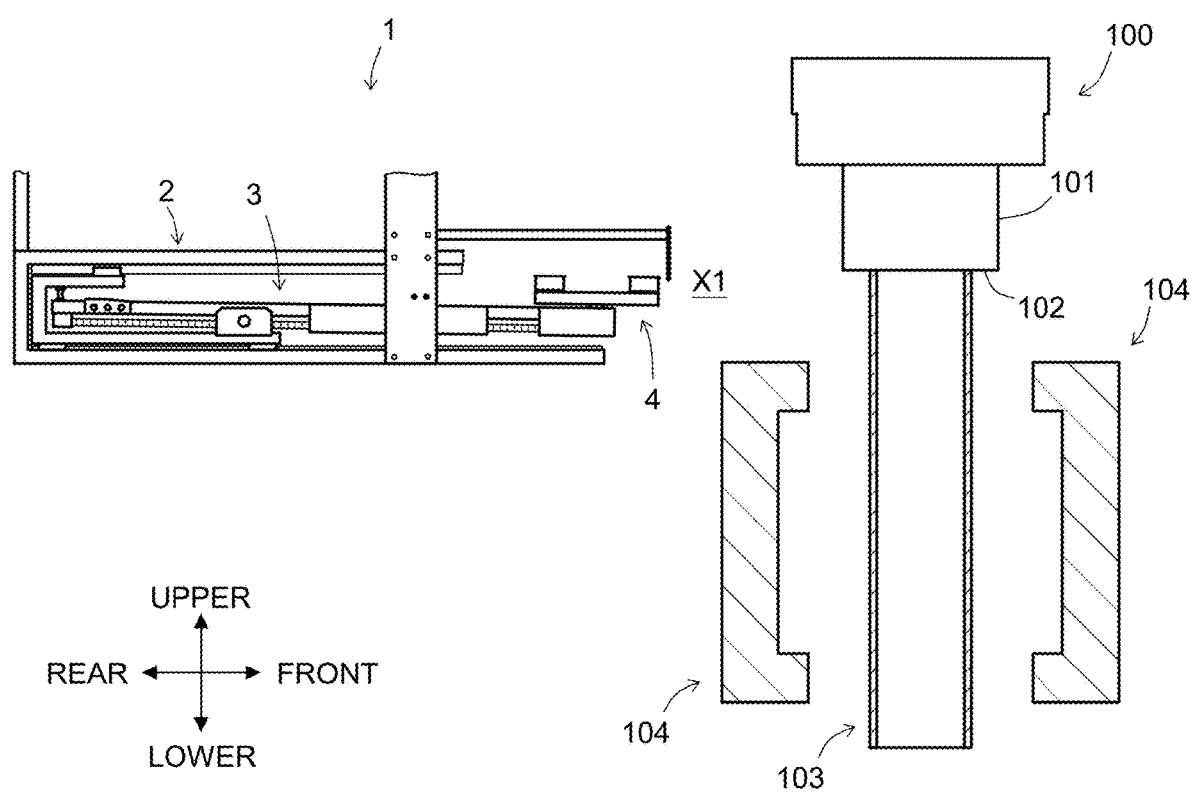
FIG. 1 is a schematic diagram illustrating positional relationship between a resin residue removal device 1 according to a first embodiment of the present invention and a molding apparatus 100 that removes a resin residue using the device 1.
Figure 2:
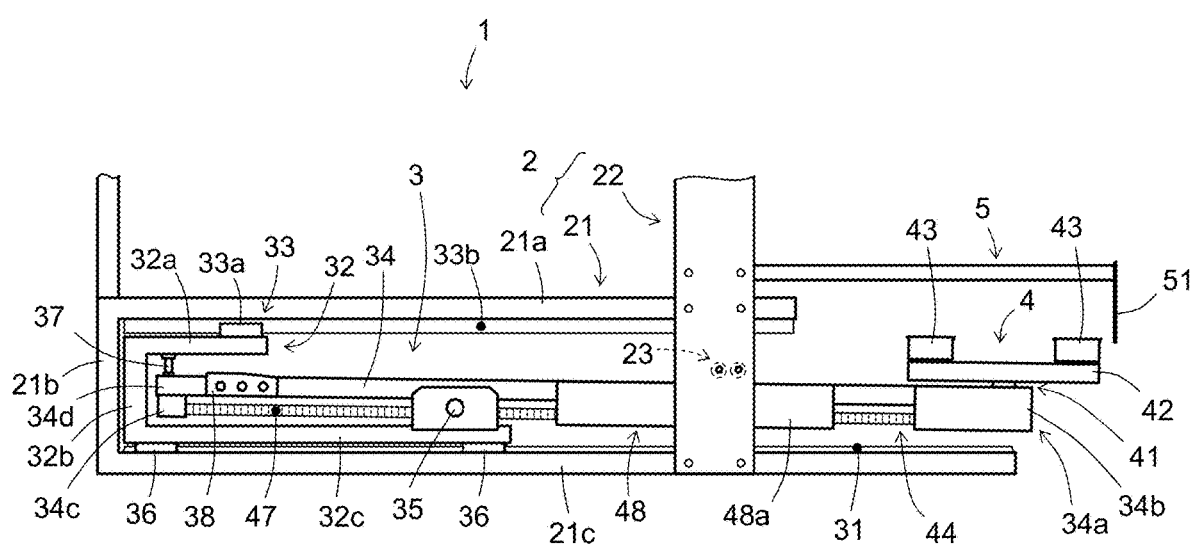
FIG. 2 is an enlarged side view of the resin residue removal device 1 in FIG. 1.

As illustrated in FIGS. 1 and 2, the resin residue removal device 1 according to the first embodiment of the present invention includes the support frame 2, a moving mechanism 3, and the resin residue removal head 4. As illustrated in FIG. 1, the resin residue removal device 1 removes a resin residue adhered to a lower surface 102 of a die 101 of a molding apparatus 100 by the resin residue removal head 4.

In this example, the molding apparatus 100 using the resin residue removal device 1 in the present embodiment extrudes a cylindrical molten resin 103 (cylindrical parison) from an annular slit (not shown) formed with the die 101 for hanging. The hung molten resin 103 is blow molded in a pair of molds 104 to obtain a hollow molded article. Then, the resin residue is basically generated by the cylindrical molten resin 103 that remains on the die 101 side after being separated into the die 101 side and the mold 104 side for closing the molds. Each configuration of the resin residue removal device 1 is detailed below.

It should be noted that, in the following description, the directions in which the resin residue removal head 4 slidingly moves are referred to as forward and backward directions and the direction in which the resin residue removal head 4 advances toward the molding apparatus 100 is referred to as a forward direction (see FIG. 1). In addition, the directions vertical to the forward and backward directions and upward and downward directions are referred to as left and right directions (see FIGS. 3A and 4A). It also should be noted that, as illustrated in FIG. 1, the forward and backward directions in the present embodiment coincide with the directions of closing and opening the molds 104.

1.1 Configuration of Resin Residue Removal Device 1

Support Frame 2

The support frame 2 includes, as illustrated in FIG. 2, a U-shaped frame 21 in an approximately U shape in side view and a pair of side frames 22 provided on both sides in width directions of the U-shaped frame 21. The U-shaped frame 21 includes an upper frame 21a, a rear frame 21b, and a lower frame 21c, and as illustrated in FIG. 2, the lower frame 21c is longer than the upper frame 21a.

Figure 6A:
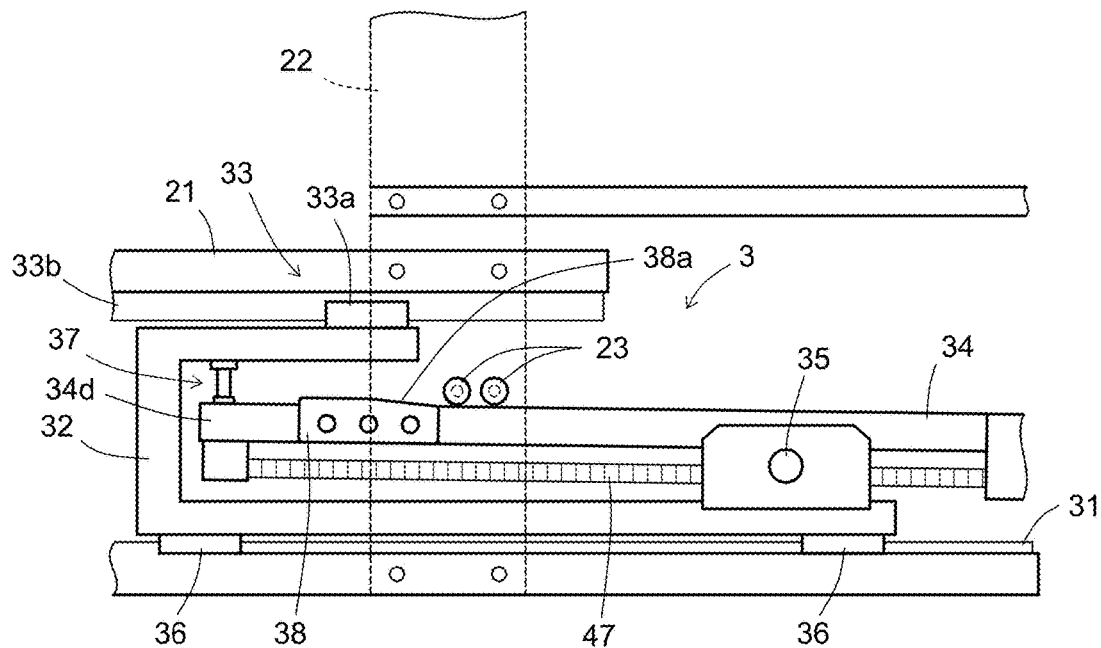
FIGS. 6A and 6B are explanatory diagrams illustrating pivoting motion of a support arm 34 of the resin residue removal device 1 in FIG. 1.
Figure 6B:
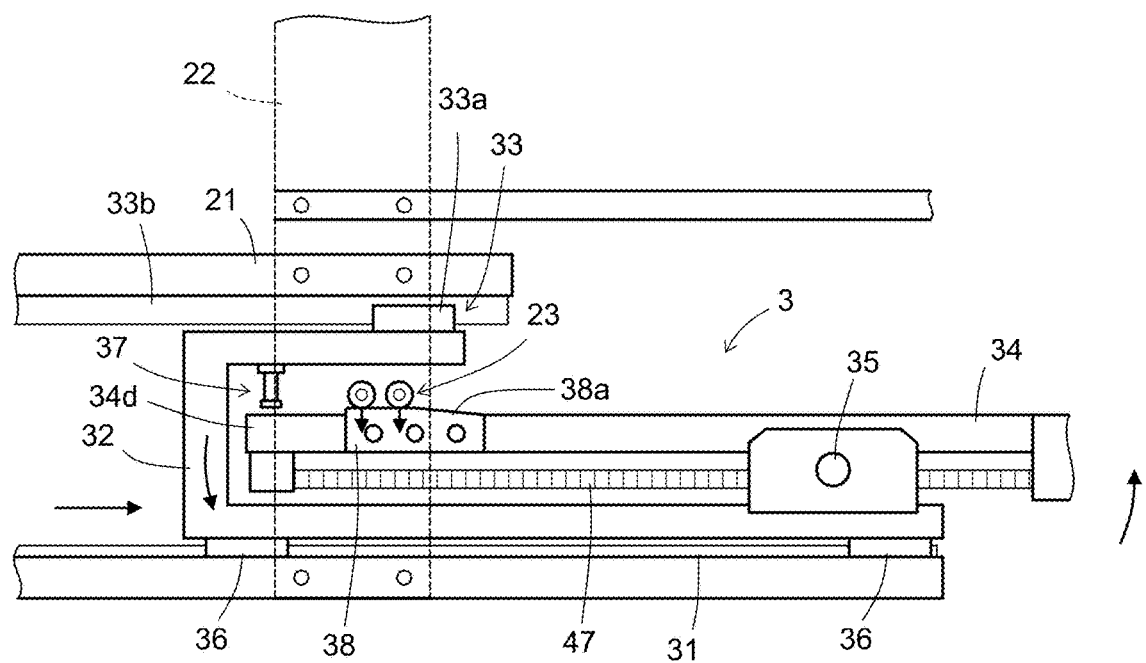

The side frames 22 are attached to the upper frame 21a and the lower frame 21c in positions near the front end of the upper frame 21a. As also illustrated in FIGS. 6A and 6B, each side frame 22 is provided with two rollers 23 inside as the pressing section configured to press the support arm 34. It should be noted that the number of rollers 23 is not limited to two each. The pair of side frames 22 support the cleaning mechanism 5 extending forward from above the U-shaped frame 21. The cleaning mechanism 5 has a distal end provided with the scraper 51 configured to scrape resin residues adhered to columnar members 42 of the resin residue removal head 4.

It should be noted that the support frame 2 itself is, for example, suspendedly supported together with the molding apparatus 100.

Moving Mechanism 3

Figure 5A:
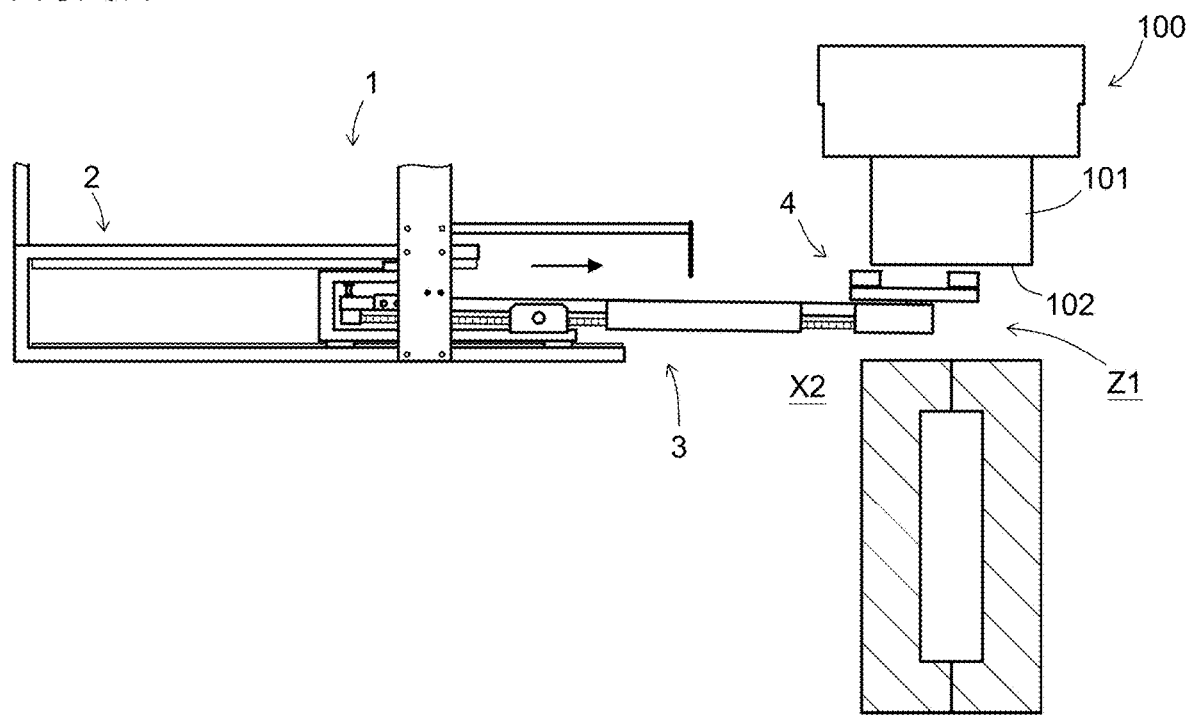
FIG. 5A is a schematic diagram illustrating a situation of the resin residue removal head 4 of the resin residue removal device 1 in FIG. 1 in an immediately below position X2 and a separate position Z1.
Figure 5B:
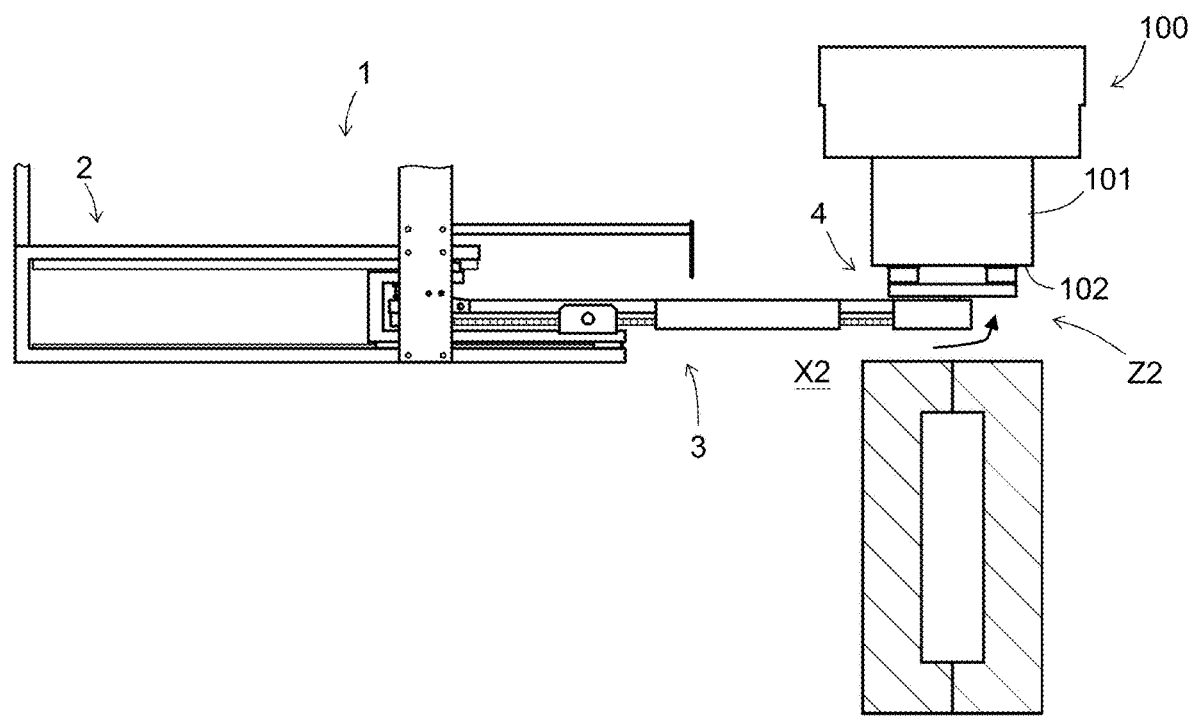
FIG. 5B is a schematic diagram illustrating a situation of the resin residue removal head 4 in the immediately below position X2 and in a close position Z2.

As illustrated in FIGS. 1, 5A, and 5B, the moving mechanism 3 causes the resin residue removal head 4 to move between a position out of a position immediately below the die 101 without interfering with molding motion and a position allowing removal of a resin residue adhered to the lower surface 102 of the die 101. As illustrated in FIG. 2, the moving mechanism 3 specifically includes a rail member 31 as the guide mechanism, a sliding member 32, a rodless cylinder 33 as the linear drive mechanism, and the support arm 34. The moving mechanism 3 provided with these configurations is supported by the support frame 2.

The rail member 31 includes a pair of rail members arranged on the left and right in parallel on an upper surface of the lower frame 21c of the support frame 2 over the forward and backward directions. Each rail member 31 slidably supports the sliding member 32 via guide blocks 36. Each rail member 31 extends toward the die 101 in a lateral position X1 (see FIG. 1) of the die 101. In other words, each rail member 31 extends along the direction of the normal line to the annular slit (not shown) formed on the die 101.

As illustrated in FIG. 2, the sliding member 32 is arranged to be in an approximately U shape in side view and to be along inside the U-shaped frame 21 of the support frame 2. The sliding member 32 includes an upper plate portion 32a, a rear plate portion 32b, and a lower plate portion 32c. In a front position on an upper surface of the lower plate portion 32c, a support shaft 35 is arranged that supports the support arm 34. On a lower surface of the lower plate portion 32c, the guide blocks 36 slidable on the rail members 31 are located in positions that respectively correspond to the pair of rail members 31 and are respectively in a front end area and a rear end area of the lower plate portion 32c. Meanwhile, in a rear position on a lower surface of the upper plate portion 32a, a pivoting restriction portion 37 is provided that is configured to restrict pivoting of the support arm 34.

The rodless cylinder 33 includes a slide block 33a and a guide rail 33b as a guide member. The slide block 33a is fixed to an upper area of the upper plate portion 32a of the sliding member 32. The guide rail 33b is provided in a lower area of an upper plate of the support frame 2 over a sliding direction. Then, movement of the slide block 33a along the guide rail 33b causes the sliding member 32 to be configured to slide along the rail members 31.

The rodless cylinder 33 may be a magnetic type or a pneumatic type. Although the rodless cylinder is used in the present embodiment as the linear drive mechanism for reduction in installation area, an electric cylinder, a pneumatic cylinder, or the like may be used as long as the cylinder is capable of reciprocatively driving the sliding member 32.

Figure 3A:
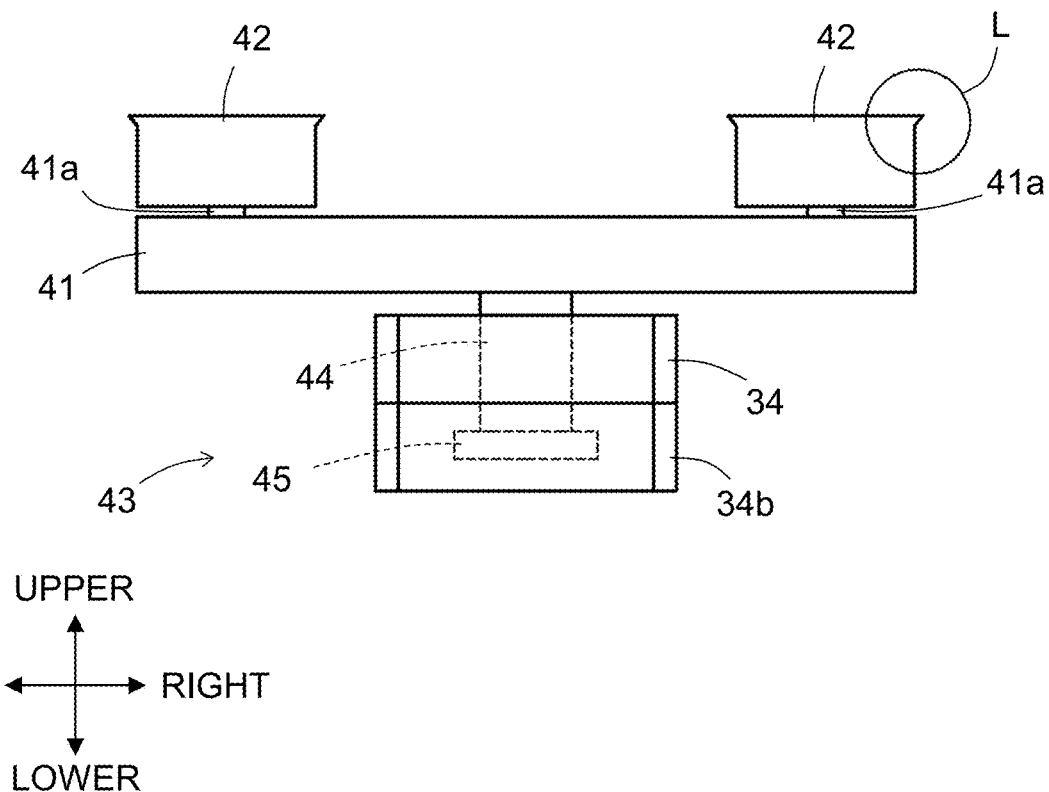
FIG. 3A is a front view of a resin residue removal head 4 of the resin residue removal device 1 in FIG. 1.
Figure 4A:
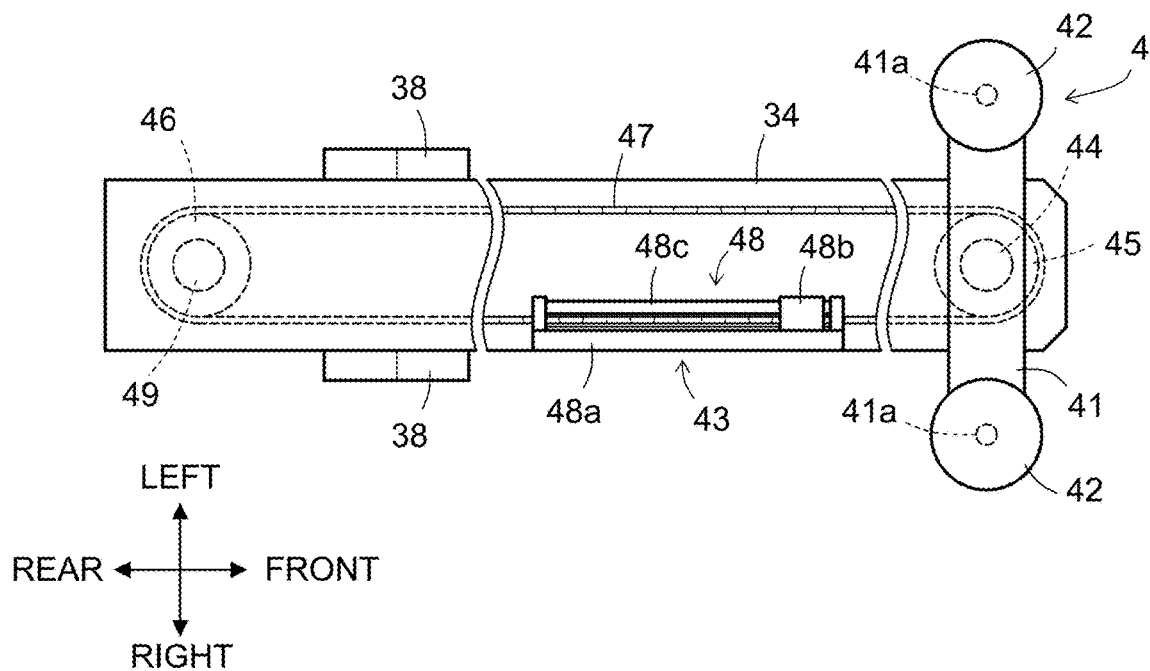
FIGS. 4A and 4B are explanatory diagrams illustrating rotation driving motion of the resin residue removal head 4 in FIG. 1.
Figure 4B:
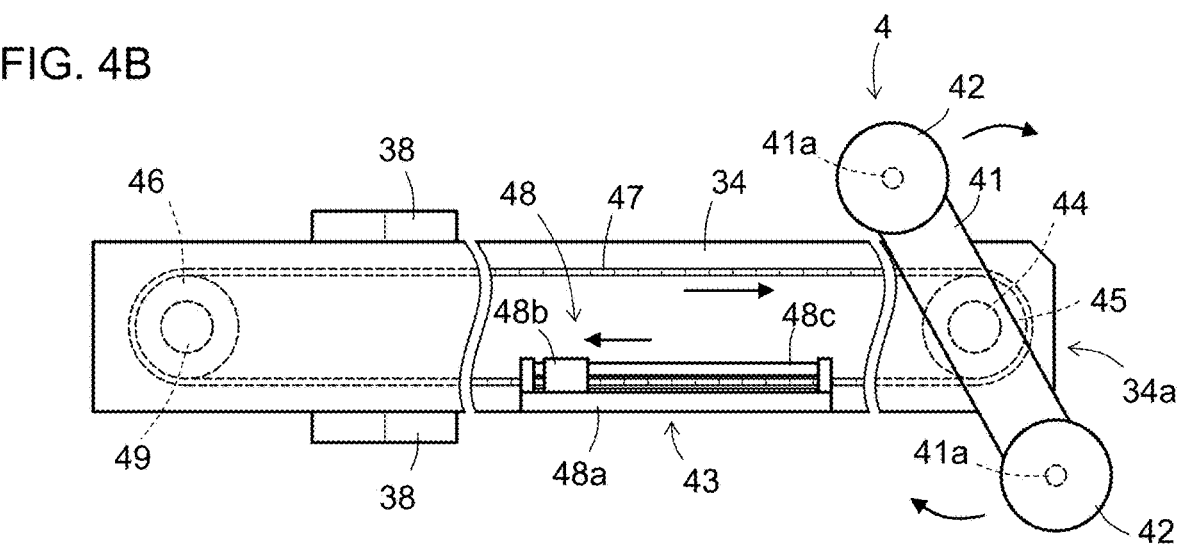

As also illustrated in FIGS. 3A, 4A, and 4B, the support arm 34 is a long and narrow plate-shaped member with an approximately rectangular cross-sectional shape. The support arm 34 supports the resin residue removal head 4 in a front end area 34a, which is an end area on the molding apparatus 100 side. The support arm 34 is pivotally supported by the support shaft 35 placed in the sliding member 32 and extending in the left and right directions, and the support arm 34 is capable of seesaw pivoting about the support shaft 35. As illustrated in FIG. 2, a cam 38 as the to-be-pressed section configured to be pressed by the rollers 23 provided in the side frames 22 is provided in a position that is on left and right side surfaces of the support arm 34 and is on a rear side from the position pivotally supported by the support shaft 35. As illustrated in FIGS. 6A and 6B, the cam 38 has an upper surface as a tilted surface 38a that is tilted upward toward a rear end side of the support arm 34.

Resin Residue Removal Head 4

As illustrated in FIG. 2 and FIGS. 3A through 4B, the resin residue removal head 4 includes a rotating plate 41, the pair of columnar members 42 as the resin residue removal member, and a removal drive mechanism 43. The resin residue removal head 4 in the present embodiment is configured to allow the pair of columnar members 42 to remove a resin residue adhered to the lower surface 102 of the die 101 by rotating the rotating plate 41 in the immediately below position X2 of the die 101 of the molding apparatus 100.

The rotating plate 41 is a long and narrow plate-shaped member with an approximately rectangular cross-sectional shape. The rotating plate 41 is arranged in the front end area 34a of the support arm 34 and is supported by the support arm 34 via a rotating shaft 44.

Figure 3B:
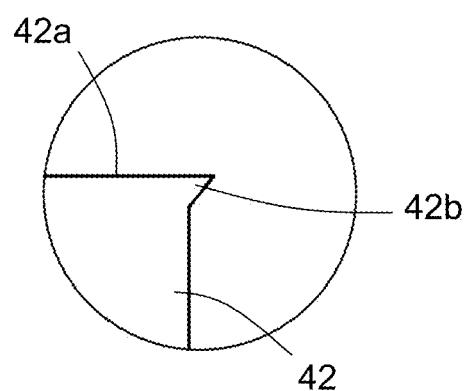
FIG. 3B is an enlarged view of the L area in FIG. 3A.

The pair of columnar members 42 are rotatably (turnably) supported by shafts 41a extending above from both end areas of the rotating plate 41. Each columnar member 42 is in a columnar shape and is arranged to have an axis directed in the upward and downward directions. The columnar member 42 thus has a circular upper surface as a facing surface 42a facing the lower surface 102 of the die 101 (see FIG. 3B). As a material for the columnar member 42, soft metal is preferably used, for example, brass. Use of the soft metal allows prevention of damage in the die 101 even in case of contacting the die 101. As illustrated in FIG. 3B, the columnar member 42 has an upper edge as an enlarged diameter portion 42b with an inversely-tapered enlarged diameter. In addition, the distance between the centers of the pair of columnar members 42 is approximately identical to the diameter of the annular slit formed on the die 101 (i.e., diameter of the cylindrical molten resin 103 hanging from the molding apparatus 100).

The removal drive mechanism 43 is configured to cause the rotating plate 41 to rotate in the front end area 34a of the support arm 34. As illustrated in FIGS. 3A, 4A, and 4B, the removal drive mechanism 43 includes the rotating shaft 44, a front end side pulley 45, a rear end side pulley 46, a chain 47, and a rodless cylinder 48.

As illustrated in FIG. 3A, the rotating shaft 44 has an upper end side fixed to the rotating plate 41 and is configured to integrally rotate the rotating shaft 44 with the rotating plate 41. The rotating shaft 44 has a lower end side to which the front end side pulley 45 is fit in a manner incapable of relative rotation. The front end side pulley 45 is arranged below the front end area 34a of the support arm 34 and is covered with a front end side cover 34b (see also FIG. 2). It should be noted that a gear for multiplying or reduction may be provided between the front end side pulley 45 and the rotating shaft 44.

The rear end side pulley 46 is arranged below a rear end area 34d of the support arm 34 and is supported by the support arm 34 via a rotating shaft 49. The rear end side pulley 46 is covered with a rear end side cover 34c (see FIG. 2). The one chain 47 is put on the front end side pulley 45 and the rear end side pulley 46. The chain 47 has both ends respectively coupled with a slide block 48b of the rodless cylinder 48 to form a ring structure.

As illustrated in FIGS. 4A and 4B, the rodless cylinder 48 includes a support plate 48a (see also FIG. 2), the slide block 48b, and a guide rail 48c. The support plate 48a is arranged to have a longitudinal direction along the forward and backward directions and is attached to the support arm 34. The support plate 48a supports the guide rail 48c. The slide block 48b is supported by the guide rail 48c and is movable along the guide rail 48c. The slide block 48b has an end side coupled with an end of the chain 47 and has the other end side coupled with the other end of the chain 47. The guide rail 48c is arranged along the longitudinal direction of the support plate 48a, that is, along the forward and backward directions. Then, movement of the slide block 48b in a rearward direction and a forward direction along the guide rail 48c causes the chain 47 to move, and in conjunction with this, causes the front end side pulley 45 and the rear end side pulley 46 to rotate clockwise and counterclockwise (see FIGS. 4A and 4B).

It should be noted that the rodless cylinder 48 may be a magnetic type or a pneumatic type. In addition, an electric cylinder, a pneumatic cylinder, or the like may be used as long as the cylinder is capable of moving the chain 47.

1.2 Motion of Resin Residue Removal Device 1

With reference to FIGS. 4A through 6B, a description is then given to motion of the resin residue removal device 1 configured as above, specifically removal head movement motion causing the resin residue removal head 4 to move and resin residue removal motion by the resin residue removal head 4. It should be noted that these motions are performed with a timing when hanging of the molten resin 103 from the slit (not shown) is interrupted after extrusion of the molten resin 103 in a molten state from the slit in the die 101 of the molding apparatus 100. More specifically, for example, motion of the resin residue removal device 1 is performed with a timing, after closing the molds 104, when an ejection tool (not shown) configured to eject a molded article after closing the molds sandwiches the molten resin 103 protruding above from the molds 104. These motions are preferably performed every time the molds 104 are closed, whereas they may be configured to be performed once in a predetermined number of times or performed in accordance with a user instruction.

It should be noted that each motion of the resin residue removal device 1 is controlled by a control mechanism, not shown. Specifically, the control mechanism may be configured with information processing equipment including, for example, a CPU, a memory (e.g., a flash memory), an input section, and an output section. The process by each component of the control mechanism described above configured by the information processing equipment is performed by reading and executing a program stored in the memory by the CPU. Examples of the information processing equipment to be used include a personal computer, a PLC (programmable logic controller), or a microcomputer. It should be noted that part of functions of the control mechanism may be configured to be executed on a cloud connected by an arbitrary communication mechanism.

Removal Head Movement Motion

In the resin residue removal device 1 in the present embodiment, as illustrated in FIGS. 1 and 5A, the moving mechanism 3 causes the resin residue removal head 4 to move between the lateral position X1 out of the position immediately below the die 101 and the immediately below position X2 as the position immediately below the die 101. As illustrated in FIGS. 5A and 5B, the moving mechanism 3 causes the resin residue removal head 4 in the immediately below position X2 to move between the separate position Z1 separate from the lower surface 102 of the die 101 and the close position Z2 close to the lower surface 102.

It should be noted that, in the present embodiment, the "immediately below position X2" refers to a position inside a virtual tube formed by extending the side surface of the die 101 downward. The resin residue removal head 4 in the immediately below position X2 refers to the rotating shaft 44 of the resin residue removal head 4 being in a position inside the tube. A specific description is given below to movement motion of the removal head by the moving mechanism 3.

While the resin residue removal motion is not performed, as illustrated in FIG. 1, the resin residue removal device 1 in the present embodiment causes the resin residue removal head 4 to be put aside in the lateral position X1 for standing by in a position without interfering with the molding motion by the molding apparatus 100. It should be noted that, as illustrated in FIGS. 2 and 6A, the support arm 34 of the moving mechanism 3 in this situation is configured to restrict pivoting, specifically rotation in a direction of lifting a rear end portion 34d of the support arm about the support shaft 35, by abutting on the pivoting restriction portion 37

(see FIG. 2) in the rear end portion 34d. Then, the support arm 34 in this situation is slightly tilted to lower the front end area 34a.

To move the resin residue removal head 4 from this situation for removal of a resin residue, the rodless cylinder 33 of the moving mechanism 3 is driven. Specifically, the slide block 33a of the rodless cylinder 33 is slid forward along the guide rail 33b. Then, in association with sliding of the slide block 33a, the sliding member 32 slides forward along the rail members 31 and the support arm 34 supported by the sliding member 32 moves forward. Then, the forward movement of the support arm 34 causes the resin residue removal head 4 supported by the front end area 34a of the support arm to move from the lateral position X1 to the immediately below position X2.

FIG. 5A illustrates a situation of the resin residue removal head 4 moving to the immediately below position X2. At the stage of FIG. 5A, the center of the resin residue removal head 4, that is, the rotating shaft 44 does not reach immediately below the center of the die 101. Then, the support arm remains tilted to lower the front end area 34a while the resin residue removal head 4 reaches the immediately below position X2 illustrated in FIG. 5A from the lateral position X1.

By further driving the rodless cylinder 33 of the moving mechanism 3 from the state of FIG. 5A, as illustrated in FIGS. 6A through 6B, the support arm 34 moves forward and the cam 38 provided to the support arm 34 approaches the rollers 23 of the side frames 22, and then the rollers 23 abut on the tilted surface 38a. Then, further forward movement of the support arm 34 causes the rollers 23 to press the cam 38 downward from above and a downward force is applied to the cam 38. The downward force applied to the cam 38 causes the support arm 34 to seesaw pivot about the support shaft 35 to move the front end area 34a of the support arm 34 upward. The support arm 34 thus becomes horizontal. In short, the rodless cylinder 33, the rollers 23, and the cam 38 in the present embodiment are considered as the pivot drive mechanism causing the support arm 34 to seesaw pivot about the support shaft 35.

Then, as illustrated in FIGS. 5A and 5B, the upward movement of the front end area 34a causes the resin residue removal head 4 inside the immediately below position X2 to move from the separate position Z1 to the close position Z2. The center (rotating shaft 44) of the resin residue removal head 4 reaches immediately below the center of the die 101 at the stage where the resin residue removal head 4 moves to the close position Z2. In this situation, the facing surfaces 42a of the columnar members 42 face the lower surface 102 of the die 101 in parallel. The resin residue removal device 1 in the present embodiment performs the resin residue removal motion described next in this situation.

It should be noted that, in the resin residue removal device 1 in the present embodiment, it is preferred to leave a slight gap (e.g., approx. 2 mm) between the die 101 and the columnar members 42 of the resin residue removal head 4 even when the support arm 34 pivots to cause the resin residue removal head 4 to move to the close position Z2. This allows prevention of interference of the rotating columnar members 42 with the die 101.

After the resin residue removal motion is finished, the moving mechanism 3 causes the slide block 33a of the rodless cylinder 33 to slide rearward along the guide rail 33b to slide the sliding member 32 rearward and to move the support arm 34 backward. On the contrary to above, the resin residue removal head 4 is thus configured to move from the close position Z2 to the separate position Z1 and then move from the immediately below position X2 to the lateral position X1.

Figure 7:
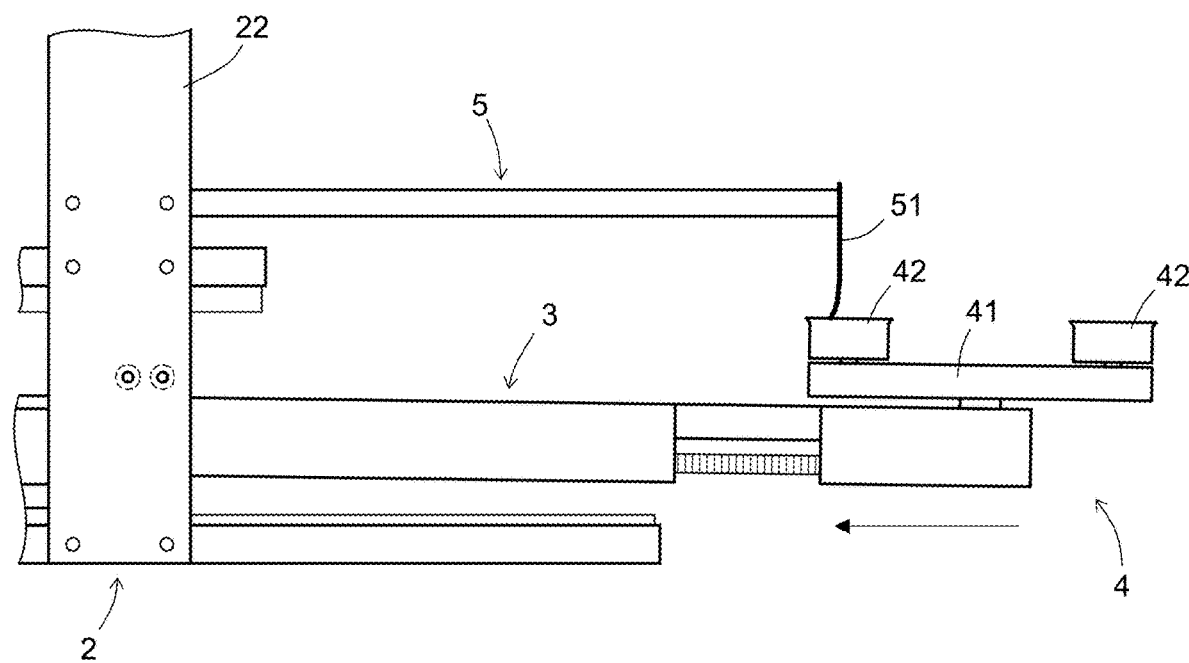
FIG. 7 is an enlarged view illustrating a cleaning mechanism 5 (scraper 51) attached to a support frame 2.

It should be noted that, as illustrated in FIG. 7, when the resin residue removal head 4 moves from the immediately below position X2 to the lateral position X1, the scraper 51 of the cleaning mechanism 5 supported by the support frame 2 (pair of side frames 22) is configured to scrape a resin residue adhered to the columnar members 42.

As just described, the moving mechanism 3 in the present embodiment is configured to cause the support arm 34 to move back and forth (horizontally move) toward the support frame 2, thereby causing the resin residue removal head 4 to move between the lateral position X1 and the immediately below position X2. In addition, the moving mechanism 3 is configured to cause the resin residue removal head 4 to move between the separate position Z1 and the close position Z2 by seesaw pivoting of the support arm 34.

Resin Residue Removal Motion

Then, the resin residue removal motion by the resin residue removal head 4 is described based on FIGS. 4A and 4B. The resin residue removal motion in the present embodiment is a motion that causes the pair of columnar members 42 to move along the lower surface 102 of the die 101. More specifically, the resin residue removal motion is a motion that causes the facing surface 42a of each columnar member 42 (see FIG. 3B) to rotate (orbit) along the annular slit of the die 101.

The resin residue removal motion is executed while the resin residue removal head 4 is in the immediately below position X2 and the close position Z2 illustrated in FIG. 5B.

The resin residue removal head 4 in the present embodiment causes the removal drive mechanism 43 to be driven to rotate the pair of columnar members 42. Specifically, the slide block 48b of the rodless cylinder 48 is moved in the forward and backward directions along the guide rail 48c. Then, the chain 47 moves in association with the sliding of the slide block 48b and causes the front end side pulley 45 to rotate. The rotation of the front end side pulley 45 causes rotation of the rotating shaft 44 fit to the front end side pulley in a manner incapable of relative rotation and also causes the rotating plate 41 fixed to the upper end side to rotate. Then, rotation of the rotating plate 41 causes the pair of columnar members 42 supported via the shafts 41a in both end areas of the rotating plate 41 to rotate.

In the present embodiment, while the resin residue removal head 4 is in the immediately below position X2 and the close position Z2 illustrated in FIG. 5B, the center (axis of the rotating shaft 44) of the resin residue removal head 4 is configured to be located at the center of the die 101, in other words, immediately below the center of the annular slit. In addition, the distance between the centers of the pair of columnar members 42 is approximately identical to the diameter of the slit. Because of them, the columnar members 42 in the present embodiment are configured to rotate along the annular slit and thus to flick away a resin residue adhered near the slit.

As just described, while the resin residue removal head 4 is in the immediately below position X2 and the close position Z2 illustrated in FIG. 5B, rotation of the pair of columnar members 42 allows effective removal of a resin residue adhered to the lower surface 102 of the die 101, in particular near the slit.

It should be noted that, in one resin residue removal motion, it is preferred to move the pair of columnar members 42 in both directions of clockwise and counterclockwise by reciprocating the slide block 48b of the rodless cylinder 48. It is thus possible to scrape a resin residue adhered to the lower surface 102 of the die 101 from both sides, allowing effective removal of the resin residue.

During rotation (orbit) of the columnar members 42 about the rotating shaft 44, the columnar members 42 themselves are also allowed to rotate (turn) about the shafts 41a. The columnar members 42 themselves rotate, and it is thus possible to suppress catching of the columnar members 42 on a resin residue.

In addition, the columnar members 42 has the upper edge with an inversely-tapered enlarged diameter as the enlarged diameter portion 42b, and it is thus possible to effectively tear off a resin residue adhered to the die 101.

1.3 Action and Effects

As described above, the resin residue removal device 1 according to the present embodiment, by driving the rodless cylinder 33, causes the support arm 34 to move back and forth toward for horizontal movement to allow the resin residue removal head 4 to move between the lateral position X1 and the immediately below position X2 and also causes the support arm 34 to pivot to allow the resin residue removal head 4 to move between the separate position Z1 and the close position Z2.

As just described, the resin residue removal device 1 in the present embodiment is capable of performing the two motions, which are the back and forth moving motion and the pivoting motion, of the support arm 34 by driving only one rodless cylinder 33. Then, pivoting motion performed by the support arm 34 in the immediately below position X2 allows prevention of interference of the resin residue removal head 4 with the die 101 during the back and forth moving motion.

It should be noted that the resin residue removal device 1 in the present embodiment allows removal of a resin residue on a die 101 with a different diameter by replacing the resin residue removal head 4.

1.4 Modifications

The invention according to the present embodiment may also be carried out in modes described below.

Modification 1-1

Figure 8A:
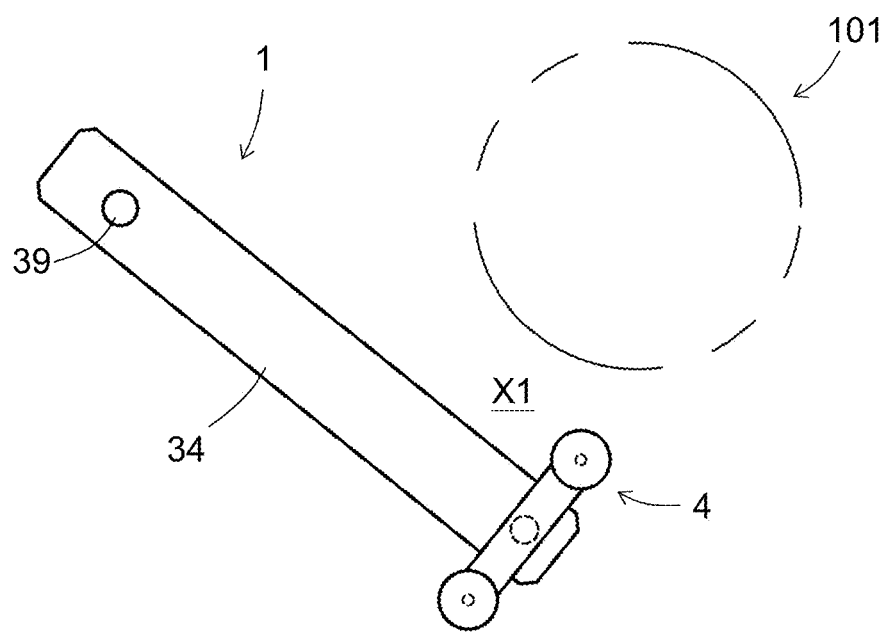
FIGS. 8A and 8B are explanatory diagrams illustrating motion of a resin residue removal device 1 according to Modification 1-1 of the first embodiment of the present invention.
Figure 8B:
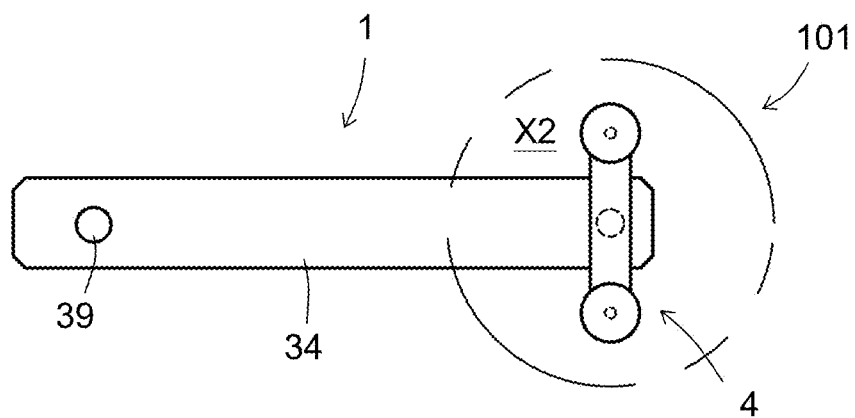

In the embodiment described above, the moving mechanism 3 is configured to cause the resin residue removal head 4 to move between the lateral position X1 and the immediately below position X2 by moving the support arm 34 back and forth for horizontal movement. However, the configuration of causing the resin residue removal head 4 to move between the lateral position X1 and the immediately below position X2 is not limited to this. For example, as illustrated in FIGS. 8A and 8B, the moving mechanism may be configured to cause the resin residue removal head 4 to move between the lateral position X1 and the immediately below position X2 by rotation driving the support arm 34 about a rotating shaft 39 vertically extending outside the die 101 in plan view using an arbitrary rotation drive mechanism (not shown). Examples of the rotation drive mechanism include an electric motor.

Modification 1-2

Figure 9A:
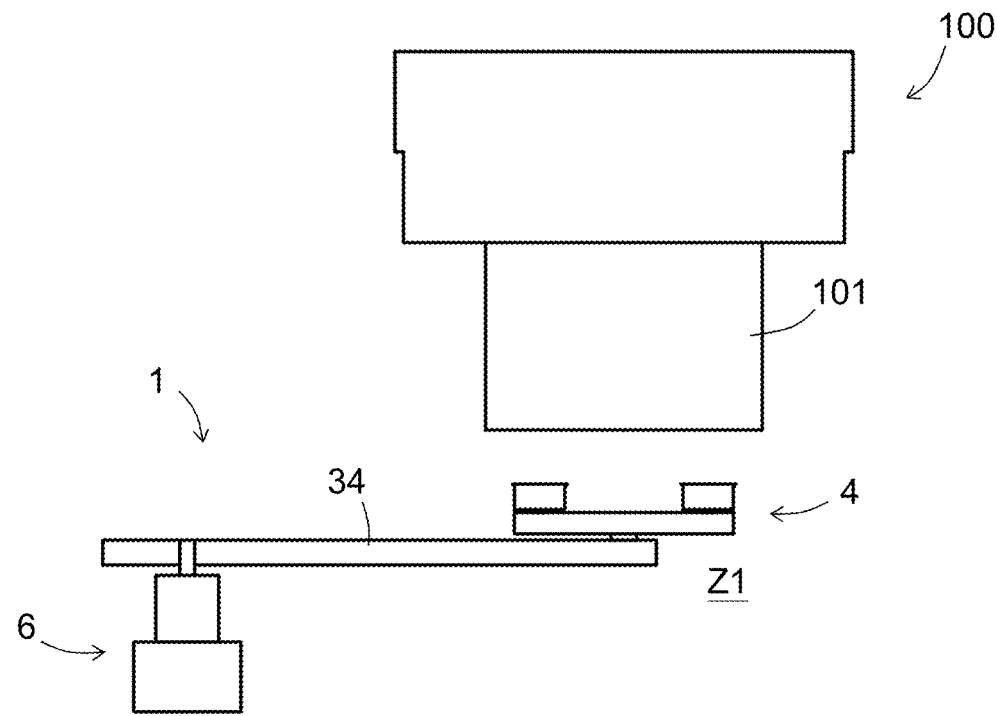
FIGS. 9A and 9B are explanatory diagrams illustrating motion of a resin residue removal device 1 according to Modification 1-2 of the first embodiment of the present invention.
Figure 9B:
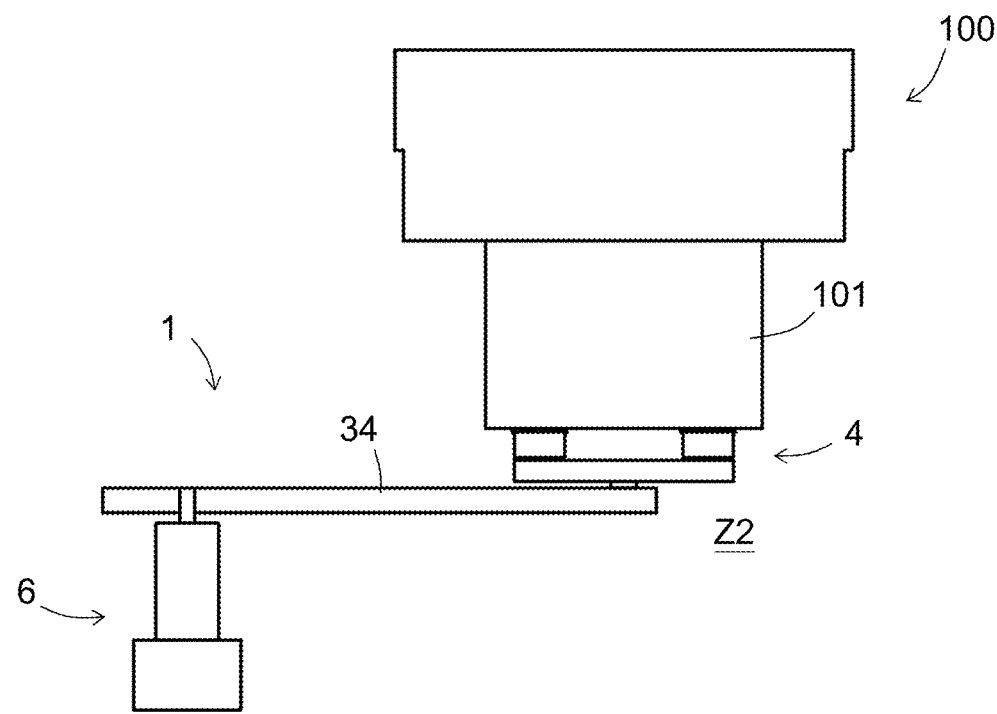

In the embodiment described above, the moving mechanism 3 is configured to cause the resin residue removal head 4 to move between the separate position Z1 and the close position Z2 by pivoting the support arm 34 about the support shaft 35. However, the configuration of causing the resin residue removal head 4 to move between the separate position Z1 and the close position Z2 is not limited to this. For example, as illustrated in FIGS. 9A and 9B, the moving mechanism may be configured to cause the resin residue removal head 4 to move between the separate position Z1 and the close position Z2 by moving up and down the support arm 34 in the upward and downward directions using an extension drive mechanism 6. Examples of the extension drive mechanism 6 include an electric cylinder. Moreover, it is also preferred to combine the configuration of pivoting the support arm 34 about the support shaft 35 with the configuration of moving the support arm 34 up and down using the extension drive mechanism 6 to be applicable to a die 101 with a different height.

Modification 1-3

Figure 24A:
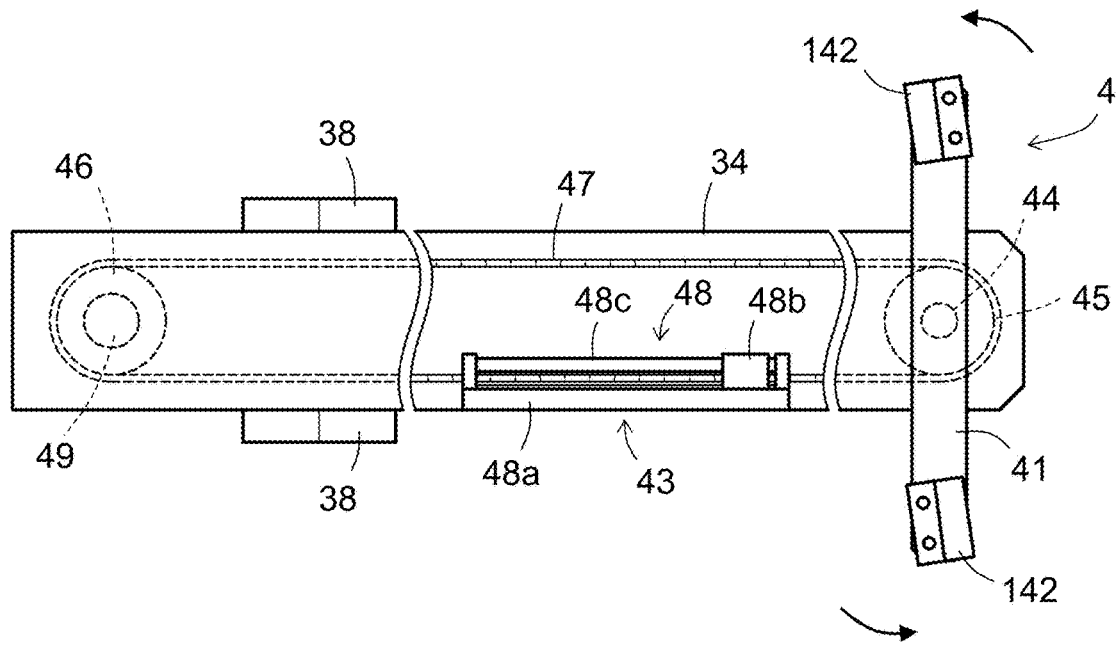
FIG. 24A is a plan view illustrating a support arm 34 and a resin residue removal head 4 of a resin residue removal device 1 according to Modification 1-3 of the first embodiment of the present invention.
Figure 24B:
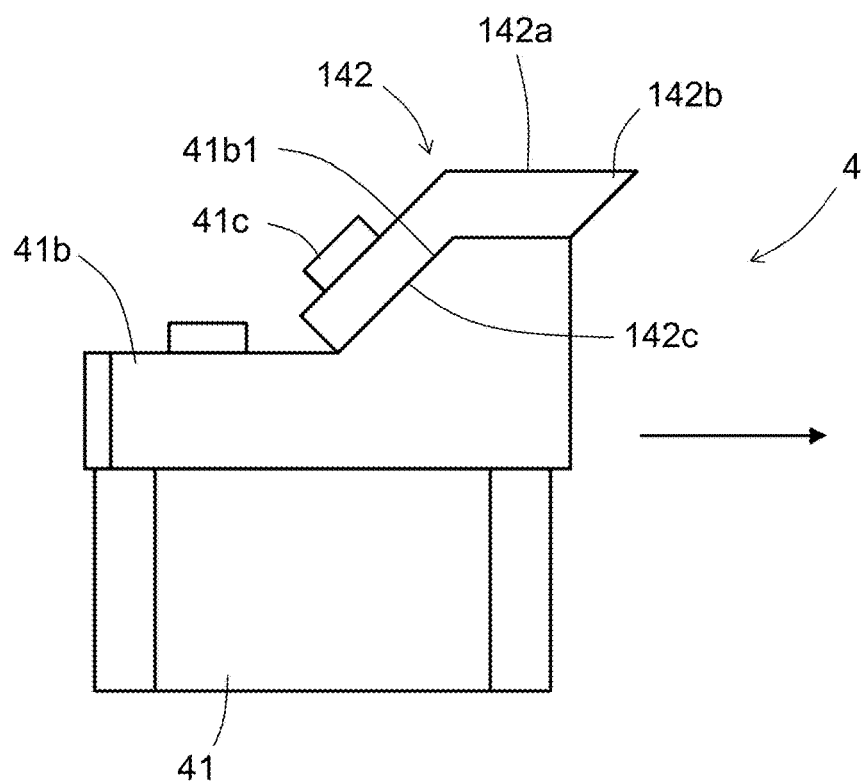
FIG. 24B is a side view illustrating a removal blade 142 attached to a rotating plate 41 of the resin residue removal head 4 in FIG. 24A via an attachment member 41b.

In the embodiment described above, the resin residue removal head 4 is configured to include the pair of columnar members 42 as the resin residue removal member for removing a resin residue. However, as illustrated in FIGS. 24A and 24B, the resin residue removal head 4 may be configured to include a pair of removal blades 142 each having a cutting edge portion 142b in the direction of rotation (direction of the arrows in FIGS. 24A and 24B) of the resin residue removal head 4 (rotating plate 41), instead of the pair of columnar members 42, as the resin residue removal member. In an example, the pair of removal blades 142 are fixed to both end areas of the rotating plate 41 via the attachment members 41b. As a material for the removal blades 142, soft metal is preferably used same as the columnar members 42, for example, brass.

It should be noted that the removal blades 142 are preferably attached to the attachment members 41b in a manner capable of adjusting a height thereof, that is, a distance between facing surfaces 142a of the removal blades 142 and the lower surface 102 of the die 101. As a specific example, as illustrated in FIG. 24B, each attachment member 41b is configured to include attachment surfaces 41b1 tilted to the direction of the rotation and each removal blade 142 is configured to include a to-be-attached surface 142c tilted corresponding to the attachment surface 41b1. Then, while the attachment surface 41b1 abut on the to-be-attached surface 142c, bolts 41c are inserted into long holes (not shown) opened in the removal blade 142 and the bolts 41c are screwed into the attachment member 41b to fix the removal blade 142. Such a configuration allows the height of the removal blade 142 to be adjusted by sliding along the attachment surface 41b1 for fixation. In addition, it is more preferred to allow fine adjustment of the angle of the removal blade 142 by adjusting the attachment angle of the removal blade 142 to the rotating plate 41.

As illustrated in FIG. 24A, the removal blades 142 in the present modification are attached at an angle to direct the cutting edge portions 142b inside to the rotating plate 41 in a rectangular shape. Specifically, in plan view, the removal blades 142 are attached to extend a virtual line formed by a distal end of each cutting edge portion 142b toward the rotating shaft of the rotating plate 41. Thus, the orientation of the distal end of each cutting edge portion 142b coincides with the direction of moving the cutting edge portion 142b rotating in association with rotation of the rotating plate 41 and it is possible to effectively scrape a resin residue adhered to the lower surface 102 of the die 101.

In addition, as illustrated in FIG. 24B, each cutting edge portion 142b has an acute-angled distal end toward the direction of the rotation in side view. The cutting edge portion 142b is capable of scraping a resin residue adhered to the lower surface 102 of the die 101 by rotating the rotating plate 41 while the facing surface 142a of the removal blade 142 is pressed against the lower surface 102 of the die 101. It should be noted that, same as the first embodiment, a slight gap may be left between the facing surfaces 142a of the removal blades 142 and the lower surface 102 of the die 101.

Other Modifications

In the above embodiment, the support arm 34 is configured to pivot using sliding motion of the sliding member 32 by the rodless cylinder 33 by downward pressing of the cam 38 of the support arm 34 from above by the rollers 23 provided in the side frames 22. However, the support arm 34 may be configured to be pivoting driven by a power mechanism separate from the rodless cylinder 33.

In the above embodiment, the resin residue removal head 4 is configured to include the pair of columnar members 42, whereas the number and the shape of columnar members 42 are not limited to this configuration. For example, the columnar members 42 may have a rectangular cross-sectional shape. In addition, only one columnar member 42 may be configured to be provided on the rotating plate 41.

In the above embodiment, the rotating plate 41 of the resin residue removal head 4 rotates by moving the chain 47 due to driving of the rodless cylinder 48. However, the rotating plate 41 may be configured to rotate by another drive mechanism, such as an electric motor.

In the above embodiment, the molding apparatus 100 using the resin residue removal device 1 has the annular slit and is configured to extrude the cylindrical molten resin 103 (parison) for hanging. However, the present invention may be used for a molding apparatus to which a molten resin in a sheet shape is supplied.

2. Second Embodiment

Figure 11:
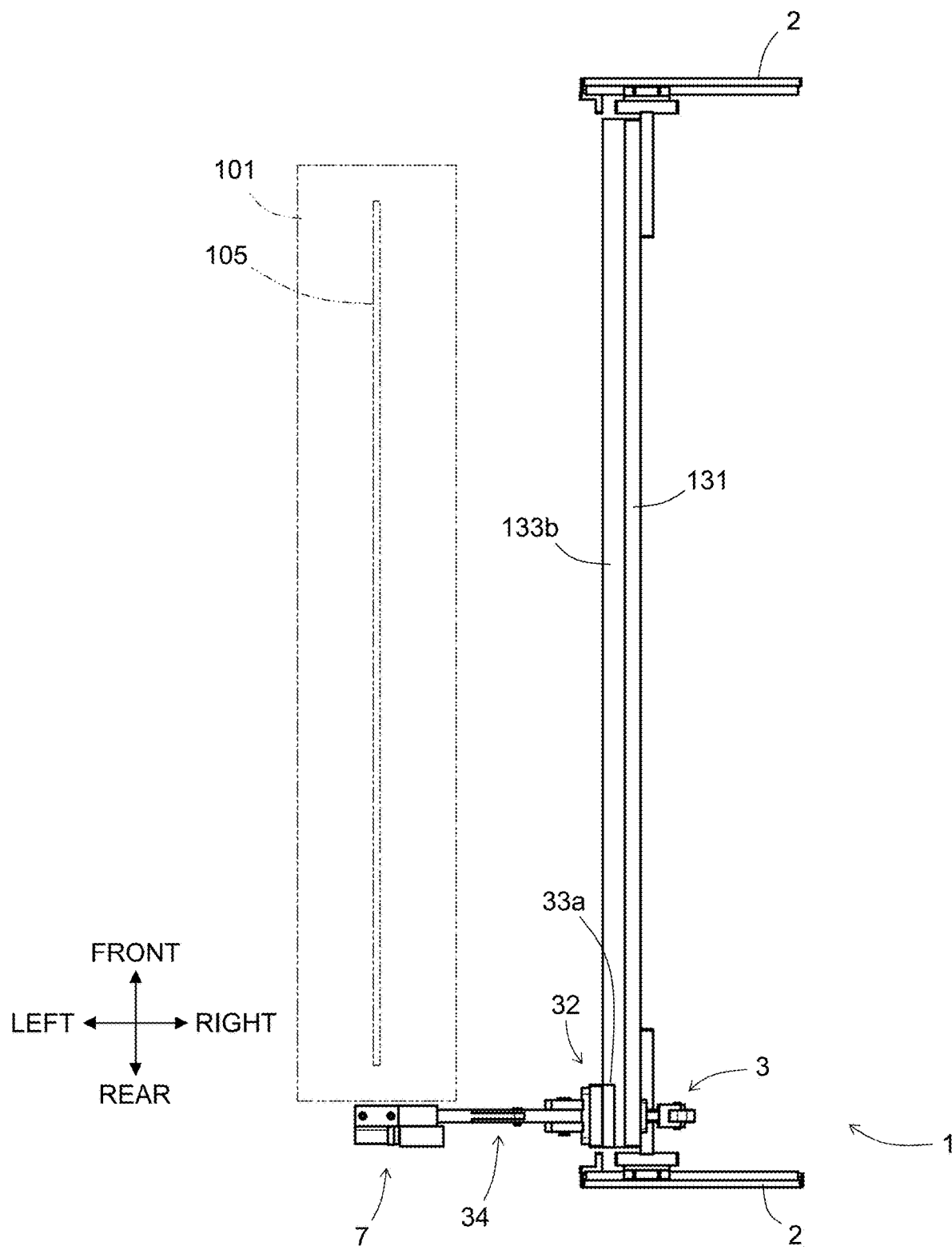
FIG. 11 is a plan view illustrating positional relationship between the resin residue removal device 1 and the molding apparatus 100 in FIG. 10.

As illustrated in FIGS. 10 and 11, a resin residue removal device 1 according to the second embodiment of the present invention includes a support frame 2, a moving mechanism 3, a resin residue removal head 7, a cleaning mechanism 5 (see FIGS. 16A and 16B), and a control mechanism 10. As illustrated in FIG. 10, the resin residue removal device 1 is configured to remove a resin residue R adhered to a lower surface 102 of a die 101 (T die) of a molding apparatus 100 by the resin residue removal head 7.

In this situation, the molding apparatus 100 using the resin residue removal device 1 in the present embodiment is different from that in the first embodiment and is configured to extrude a molten resin 103 in a sheet shape (resin sheet), and a linear slit 105 (see FIG. 11) capable of extruding the molten resin 103 is formed on the lower surface 102 of the die 101 (T die). As illustrated in FIG. 10, the molding apparatus 100 includes a pair of molding apparatuses arranged to hang a pair of the molten resins 103 in parallel. The pair of molten resins 103 hanging from the respective molding apparatuses 100 are formed by the pair of molds 104 and subjected to closing the molds, thereby being configured to be molded into a molded resin article. It should be noted that a resin residue is likely to be generated in particular when a molten resin 103 with an added filler (particularly, glass) is used.

As illustrated in FIG. 10, the resin residue removal device 1 in the present embodiment is provided to each of the pair of molding apparatuses 100. Then, a resin residue is basically generated by the molten resins 103 in a sheet shape that remain on the die 101 side after being separated into the die 101 side and the mold 104 side for closing the molds. Each configuration of the resin residue removal device 1 in the present embodiment is detailed below. It should be noted that the pair of the resin residue removal devices 1 provided to each molding apparatus 100 has identical configuration and thus only one of the resin residue removal devices 1 is described below.

It should be noted that, in the following description of the present embodiment, as illustrated in FIG. 11, the longitudinal direction of the slit 105 of the die 101 is referred to as forward and backward directions and the directions vertical to the forward and backward directions and upward and downward directions are referred to as left and right directions (see FIGS. 10 and 12). In addition, as illustrated in FIG. 10, the left and right directions in the present embodiment coincide with the directions of closing and opening the molds 104.

2.1 Configuration of Resin Residue Removal Device 1

Support Frame 2

Figure 12:
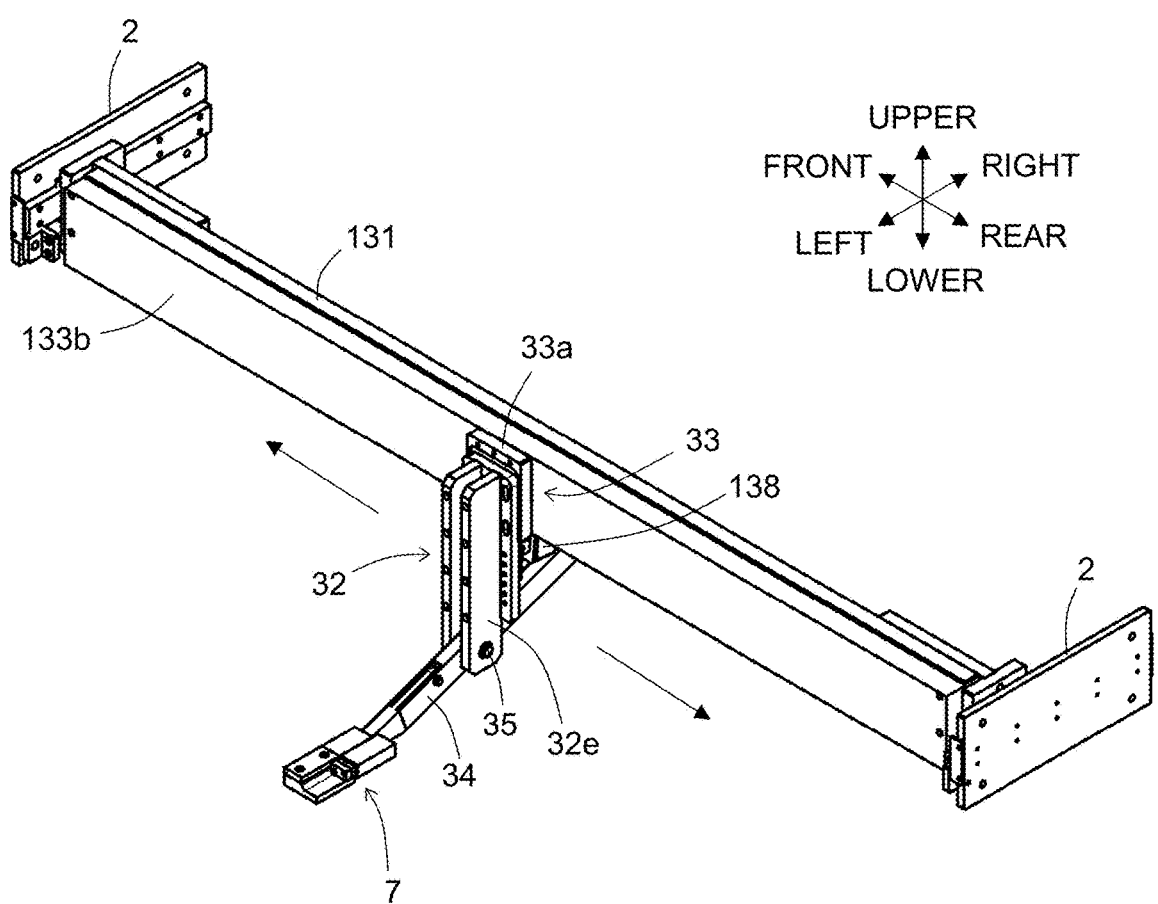
FIG. 12 is a perspective view of the resin residue removal device 1 in FIG. 10.

As illustrated in FIGS. 11 and 12, the support frame 2 includes a pair of support frames provided with a space in between in the forward and backward directions, that is, in the longitudinal direction of the die 101. The support frames 2 support a guide mechanism 131 of the moving mechanism 3. It should be noted that the support frames 2 themselves are, for example, suspendedly supported together with the molding apparatus 100.

Moving Mechanism 3

The moving mechanism 3 causes the resin residue removal head 7 to move between a position out of the position immediately below the die 101 without interfering with molding motion (see FIGS. 11 and 17A) and a position allowing removal of a resin residue adhered to the lower surface 102 of the die 101 (see FIGS. 17B and 17C). As illustrated in FIGS. 11 and 12, the moving mechanism 3 specifically includes the guide mechanism 131, a sliding member 32, a rodless cylinder 33 as the linear drive mechanism, a support arm 34, and a first pneumatic cylinder 138 as the pivot drive mechanism. The moving mechanism 3 provided with these configurations is supported by the support frames 2.

The guide mechanism 131 is arranged to extend in the forward and backward directions along the longitudinal direction of the die 101 between the pair of support frames 2. The guide mechanism 131 slidably supports the sliding member 32 via the rodless cylinder 33.

Figure 13:
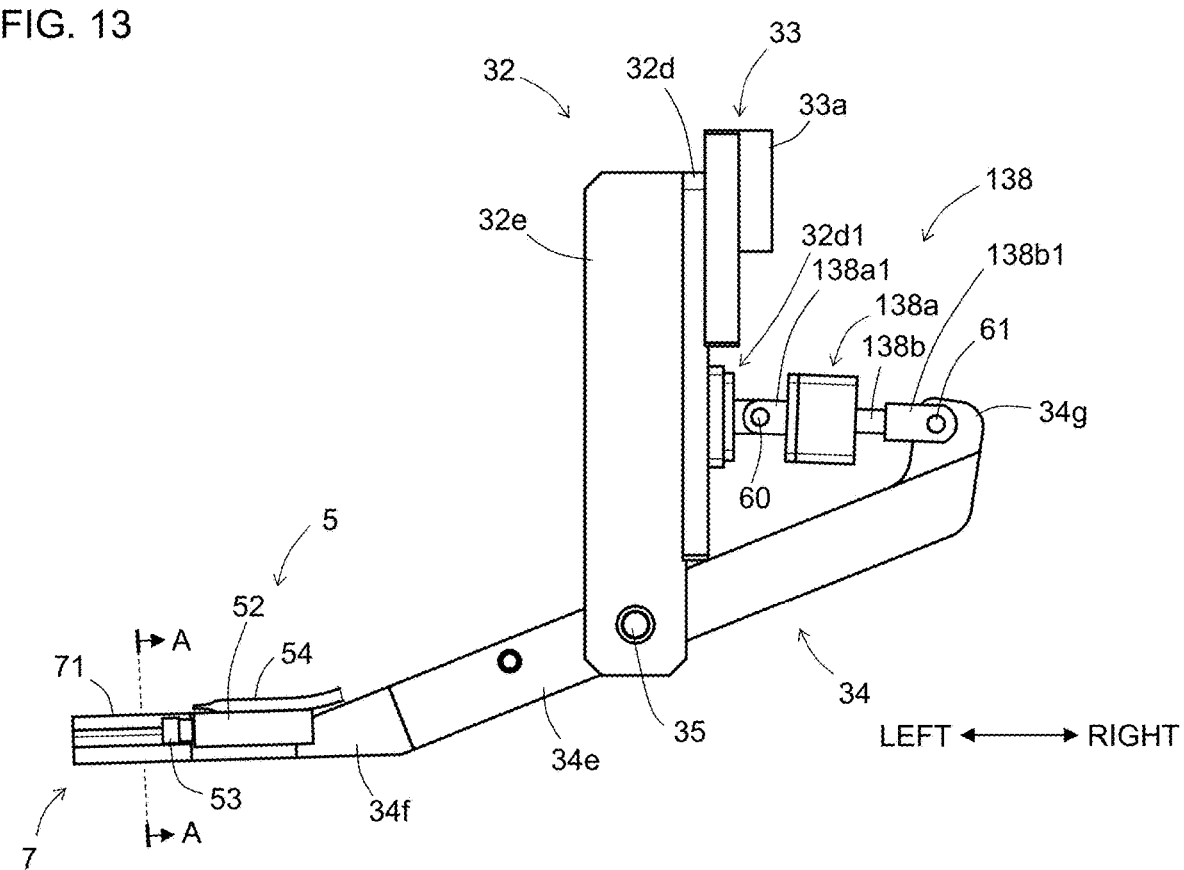
FIG. 13 is a side view of the resin residue removal device 1 in FIG. 10.

As illustrated in FIG. 13, the sliding member 32 includes a connection plate 32d and a pair of arm support plates 32e. The connection plate 32d is supported by the slide block 33a of the rodless cylinder 33 described later and also supports the pair of arm support plates 32e. The connection plate 32d is a plate-shaped member with the principal plane having the left and right directions as a direction of the normal line, and as illustrated in FIG. 13, extends downward from a position supported by the slide block 33a described later. The connection plate 32d supports the pair of arm support plates 32e on the opposite side to the slide block 33a (i.e., left side) and supports a one-end side attachment section 138a1 of the first pneumatic cylinder 138 on the same side as the slide block 33a (i.e., right side) and in an attachment base 32d1 provided in a position below the slide block 33a.

Meanwhile, as illustrated in FIG. 12, the pair of arm support plates 32e are plate-shaped members with the respective principal plane having the forward and backward directions as a direction of the normal line and are supported by the connection plate 32d to be aligned in parallel with a space in between in the forward and backward directions. As illustrated in FIG. 13, the pair of arm support plates 32e also extends below a lower end of the connection plate 32d and pivotally supports the support arm 34 via a support shaft 35 extending in the forward and backward directions in a position in a lower end area of the pair of arm support plates 32e and between the pair of arm support plates 32e.

As illustrated in FIGS. 11 and 12, the rodless cylinder 33 includes the slide block 33a and a guide member 133b. The slide block 33a is supported by the guide member 133b and slides in the forward and backward directions along the guide member 133b. The slide block 33a also supports the connection plate 32d of the sliding member 32. The guide member 133b is supported by the guide mechanism 131 and is arranged to extend in the forward and backward directions along the longitudinal direction of the die 101 between the pair of support frames 2. Then, the rodless cylinder 33 is configured to cause the sliding member 32 to slide along the guide mechanism 131 by movement of the slide block 33a along the guide member 133b.

It should be noted that the rodless cylinder 33 may be a magnetic type or a pneumatic type. Although the rodless cylinder is used in the present embodiment as the linear drive mechanism for reduction in installation area, an electric cylinder, a pneumatic cylinder, or the like may be used as long as the cylinder is capable of reciprocatively driving the sliding member 32.

As illustrated in FIGS. 12 and 13, the support arm 34 is a long and narrow plate-shaped member with an approximately rectangular cross-sectional shape vertical to the longitudinal direction and supports the resin residue removal head 7. The support arm 34 is pivotally supported by the support shaft 35, which extends in the forward and backward directions and is placed in the arm support plates 32e, and is capable of seesaw pivoting about the support shaft 35. The support arm 34 specifically includes a linear body portion 34e into which the support shaft 35 is inserted, a distal end portion 34f located at an end area on the molding apparatus 100 side and supporting the resin residue removal head 7, and a base end portion 34g located at an end area on the opposite side to the distal end portion 34f and connected to the first pneumatic cylinder 138. The body portion 34e is supported downward to a lower end of the die 101 by the support shaft 35 and the first pneumatic cylinder 138. The distal end portion 34f supports the resin residue removal head 7 to have a plate-shaped base member 70 (described later) to be approximately horizontal.

As illustrated in FIG. 13, the first pneumatic cylinder 138 as the pivot drive mechanism includes a cylinder portion 138a and a rod portion 138b. The cylinder portion 138a is provided with the one-end side attachment section 138a1, and the rod portion 138b has a distal end provided with an another-end side attachment section 138b1. The one-end side attachment section 138a1 is rotatably coupled with the attachment base 32d1 of the sliding member 32 via a rotating shaft 60, and the another-end side attachment section 138b1 is rotatably coupled with the base end portion 34g of the support arm 34 via a rotating shaft 61. In this example, both the rotating shaft 60 and the rotating shaft 61 are shafts extending in the forward and backward directions. The first pneumatic cylinder 138 thus configured causes the support arm 34 to seesaw pivot about the support shaft 35 by extending the rod portion 138b to the cylinder portion 138a. Specifically, the distal end portion 34f of the support arm 34 is configured to pivot to be lowered when the rod portion 138b is retracted, and the distal end portion 34f of the support arm 34 is configured to be lifted when the rod portion 138b is extended.

Resin Residue Removal Head 7

Figure 14:
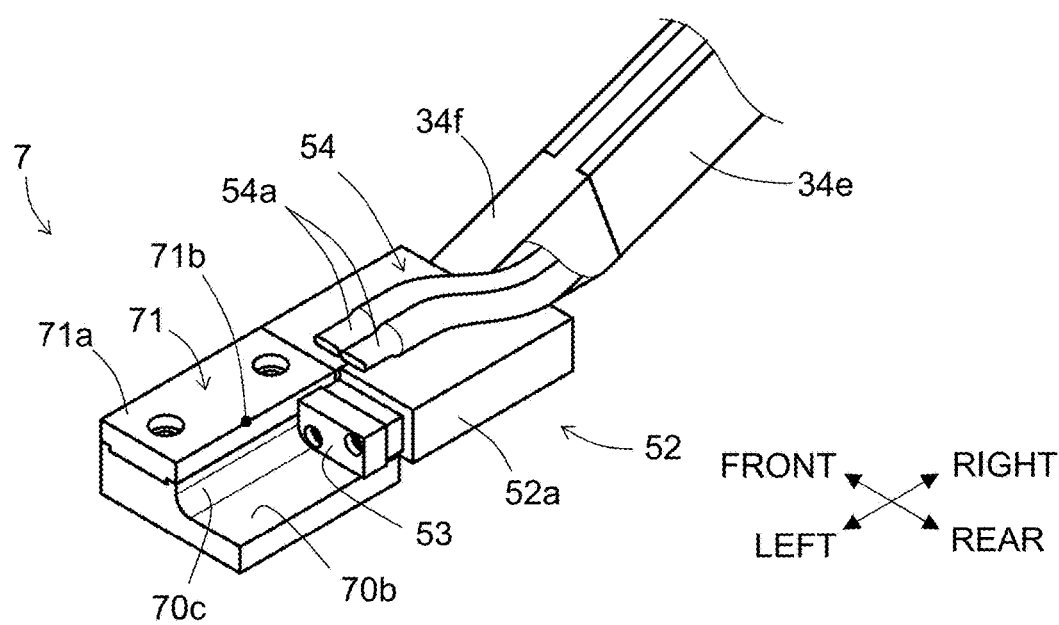
FIG. 14 is a perspective view illustrating a resin residue removal head 4 of the resin residue removal device 1 in FIG. 10.

As illustrated in FIG. 14, the resin residue removal head 7 includes the base member 70 and a plate-shaped member 71 as the resin residue removal member. The resin residue removal head 7 in the present embodiment is configured to allow removal of a resin residue adhered to the lower surface 102 of the die 101 using the plate-shaped member 71 by moving the plate-shaped member 71 along the slit 105 in the immediately below position X2 of the die 101 of the molding apparatus 100.

The base member 70 is supported by the distal end portion 34f of the support arm 34 on the right side. The base member 70 is specifically configured to be plate shaped with an approximately rectangular shape in plan view. As illustrated in the cross-sectional view vertical to the left and right directions in FIG. 15, a rough quadrant of the rectangular shape of the base member 70 in the plan view has an upper surface 70a, the upper surface 70a on the left side and the front side being higher than the upper surface 70a on the left side and the rear side. Then, the base member 70 supports the plate-shaped member 71 on the upper surface 70a on the left side and the front side. The upper surface on the left side and the rear side is a residue receiver section 70b configured to receive a resin residue scraped by the plate-shaped member 71. It should be noted that there is a vertical surface 70c connecting the upper surface 70a on the left side and the front side to the residue receiver section 70b on the left side and the rear side and the vertical surface 70c has a curved lower portion to be smoothly connected to the residue receiver section 70b. The base member 70 also supports a second pneumatic cylinder 52 of the cleaning mechanism 5 on the upper surface on the right side and the front side in the plan view.

Figure 15:
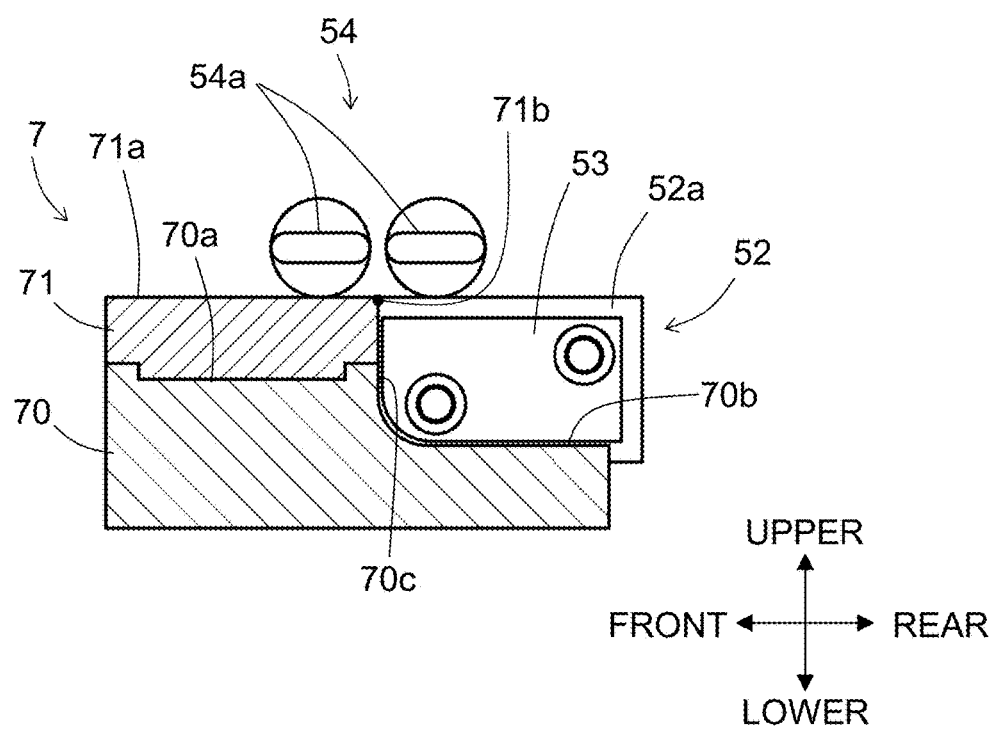
FIG. 15 is a cross-sectional view taken along line A-A in FIG. 13.

As illustrated in FIG. 15, the plate-shaped member 71 is a plate-shaped member with the principal plane having the upward and downward directions as a direction of the normal line and has an upper surface as a facing surface 71a facing the lower surface 102 of the die 101. The side where the facing surface 71a of the plate-shaped member 71 and a rear surface of the plate-shaped member 71 meet is a removal edge 71b configured to scrape a resin residue. As a material for the plate-shaped member 71, metal softer than the base member 70 is preferably used, for example, brass.

Cleaning Mechanism 5

Figure 16A:
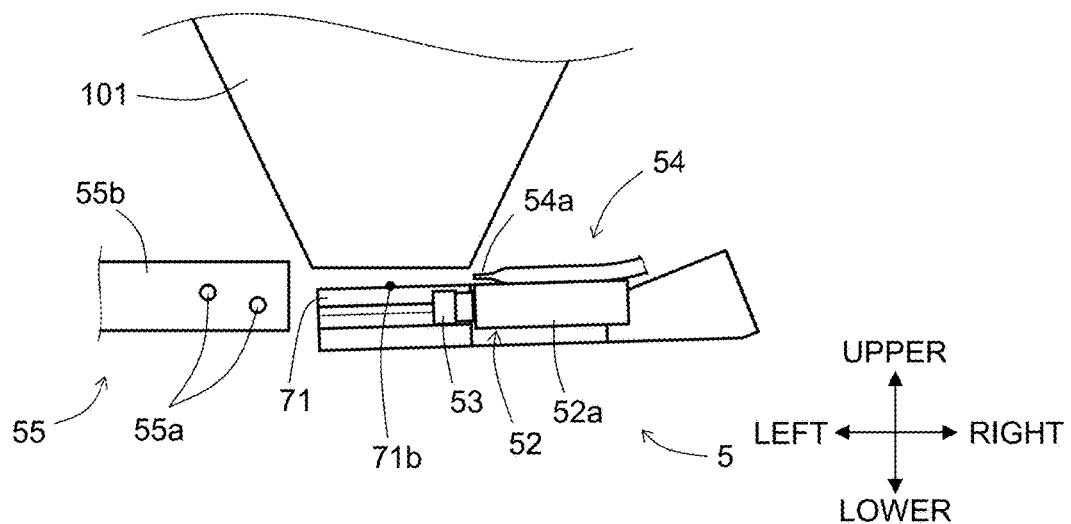
FIG. 16A is a side view illustrating arrangement of a cleaning mechanism 5 of the resin residue removal device 1 in FIG. 10.
Figure 16B:
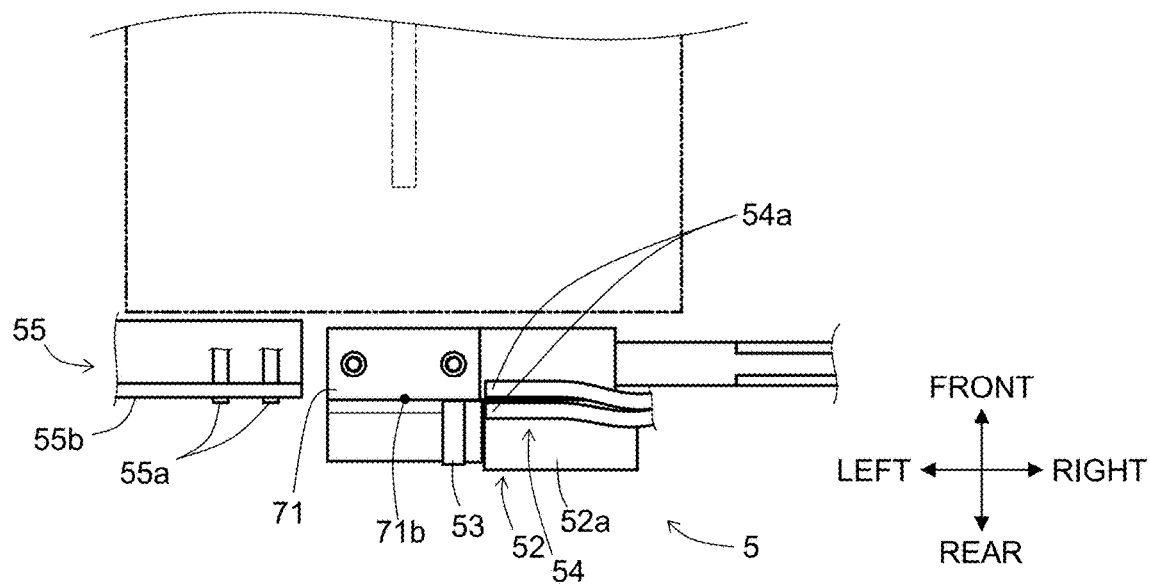
FIG. 16B is a plan view illustrating the arrangement of the cleaning mechanism 5.
Figure 20A:
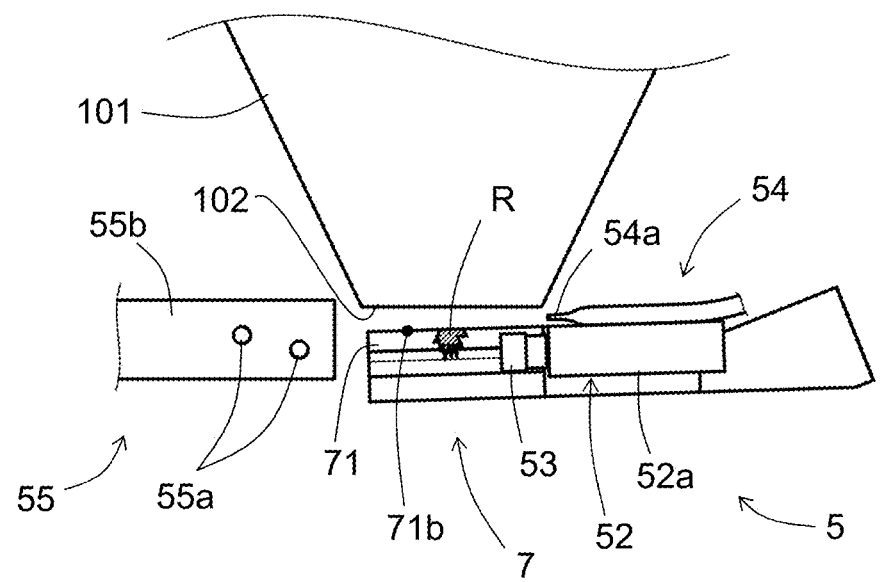
FIGS. 20A and 20B are side views illustrating a situation of the cleaning mechanism 5 of the resin residue removal device 1 in FIG. 10 removing a resin residue R adhered to the resin residue removal head 4.
Figure 20B:
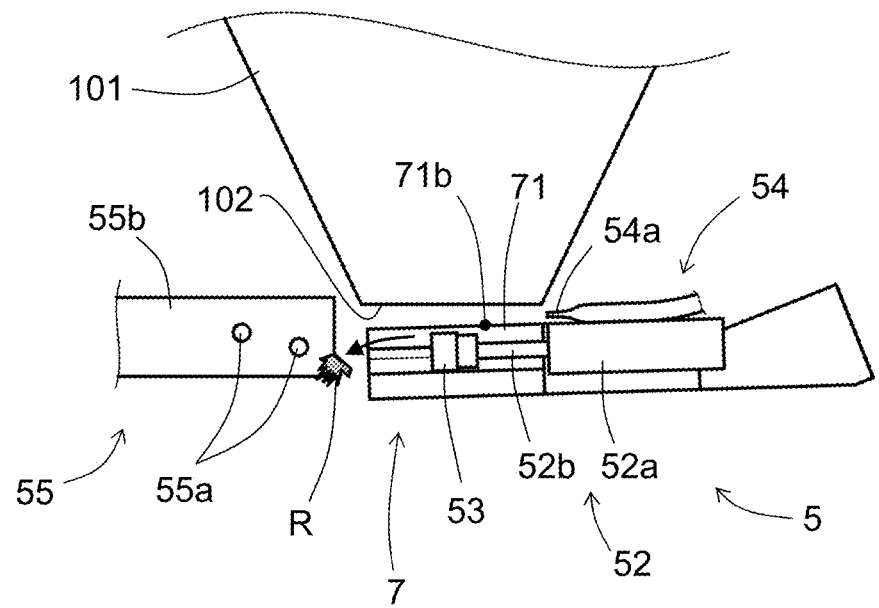
Figure 21A:
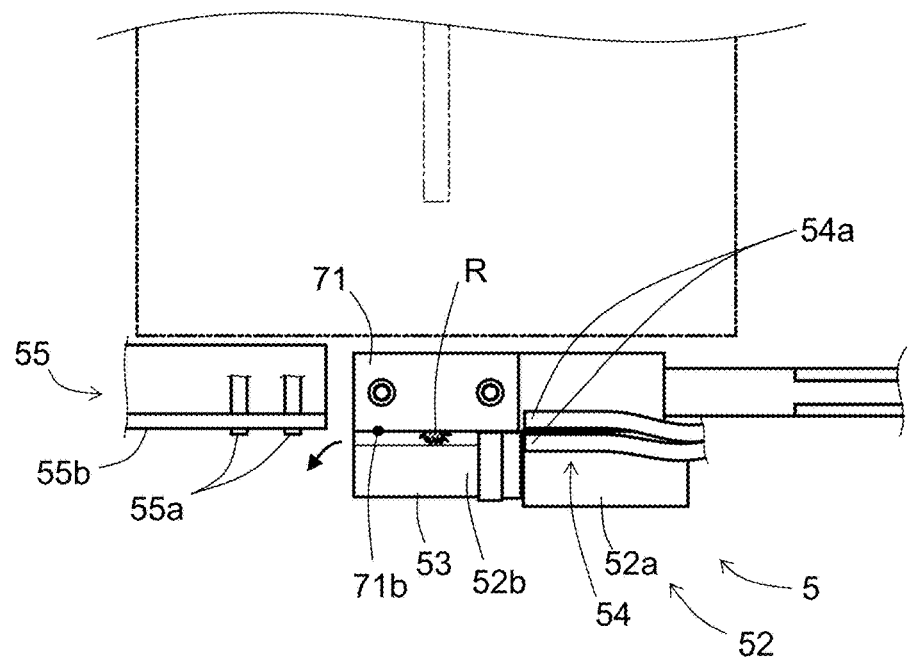
FIGS. 21A and 21B are plan views illustrating a situation of the cleaning mechanism 5 of the resin residue removal device 1 in FIG. 10 removing the resin residue R adhered to the resin residue removal head 4.
Figure 21B:
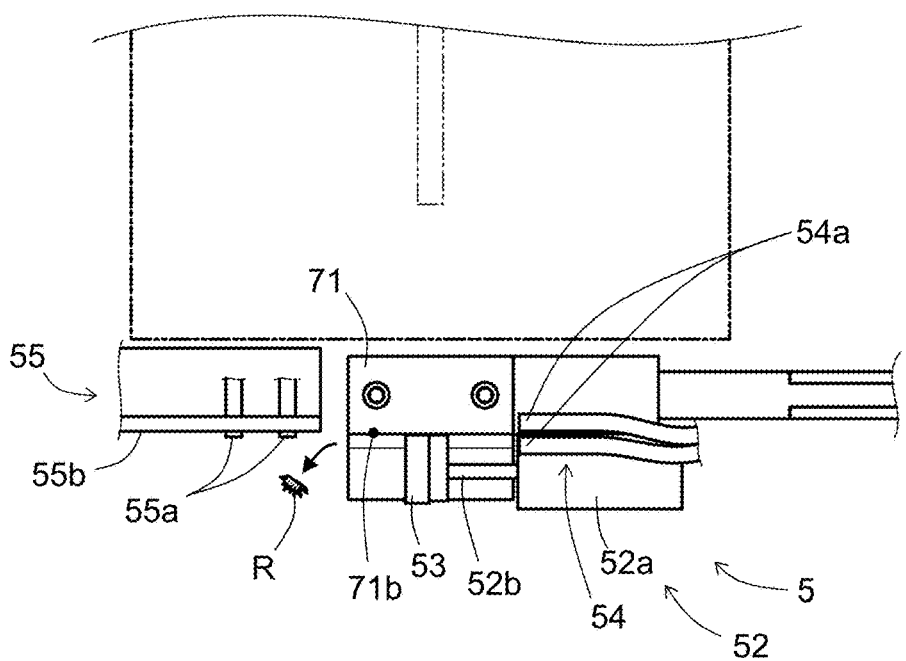

The cleaning mechanism 5 is used for removing a resin residue R (see FIGS. 20A and 21A) from the plate-shaped member 71, the resin residue R being scraped from the die 101 by the plate-shaped member 71 of the resin residue removal head 7 and being adhered to the plate-shaped member 71. As illustrated in FIGS. 16A and 16B, the cleaning mechanism 5 includes the second pneumatic cylinder 52 and a cleaning member 53 as a back-and-forth movement cleaning mechanism, a first air blowing mechanism 54, and a second air blowing mechanism 55. The second pneumatic cylinder 52 causes a piston, not shown, to move back and forth in a cylinder 52a by supplying compressed air to drive a rod 52b (FIGS. 20B and 21B) coupled with the piston to move back and forth. It should be noted that the back-and-forth movement cleaning mechanism may be configured with a configuration other than the second pneumatic cylinder 52 to drive the cleaning member 53 to move back and forth.

The cleaning member 53 is attached to a distal end of the rod 52b. As illustrated in FIGS. 14 and 15, the cleaning member 53 is configured to be rectangular parallelepiped with an approximately rectangular shape in cross-sectional view vertical to the left and right directions and to be curved (shaped with a rounded corner) in the cross-sectional view on the side where the rear surface and the lower surface meet corresponding to the smooth connection between the vertical surface 70c and the residue receiver section 70b of the base member 70.

The second pneumatic cylinder 52 is arranged above the base member 70 of the resin residue removal head 7 on the right side and the rear side. The second pneumatic cylinder 52 is also arranged in the orientation of the left and right movement of the cleaning member 53 along the removal edge 71b of the plate-shaped member 71.

The first air blowing mechanism 54 includes a pair of front and rear nozzles 54a and an air supply source (not shown). As illustrated in FIGS. 14 through 16B, the pair of nozzles 54a is arranged above the resin residue removal head 7 and on the right side of the plate-shaped member 71 and the cleaning member 53. The first air blowing mechanism 54 is then configured to blow compressed air to the plate-shaped member 71 and the cleaning member 53 from the right side via the nozzles 54a.

The second air blowing mechanism 55 includes a pair of left and right nozzles 55a, an air supply source (not shown), and a nozzle support frame 55b. As illustrated in FIGS. 16A and 16B, the pair of nozzles 55a are supported by the nozzle support frame 55b in a position on the left side of the resin residue removal head 7. The second air blowing mechanism 55 is then configured to blow compressed air rearward via the nozzles 55a in the position on the left side of the resin residue removal head 7.

Control Mechanism 10

The control mechanism 10 controls each motion of the resin residue removal device 1. The control mechanism 10 specifically controls the motion of the rodless cylinder 33 and the first pneumatic cylinder 138 of the moving mechanism 3 and of the second pneumatic cylinder 52, the first air blowing mechanism 54, and the second air blowing mechanism 55 of the cleaning mechanism 5.

Specifically, the control mechanism 10 may be configured with information processing equipment including, for example, a CPU, a memory (e.g., a flash memory), an input section, and an output section. The process by each component of the control mechanism 10 described above configured by the information processing equipment is performed by reading and executing a program stored in the memory by the CPU. Examples of the information processing equipment to be used include a personal computer, a PLC (programmable logic controller), or a microcomputer. It should be noted that part of functions of the control mechanism 10 may be configured to be executed on a cloud connected by an arbitrary communication mechanism.

2.2 Motion of Resin Residue Removal Device 1

With reference to FIGS. 17A through 21B, a description is then given to motion of the resin residue removal device 1 in the present embodiment, specifically removal head movement motion causing the resin residue removal head 7 to move for removing a resin residue and resin residue cleaning motion configured to clean the resin residue R adhered to the resin residue removal head 7. These motions are controlled by the control mechanism 10 in accordance with a user instruction or a preset program. It should be noted that the removal head movement motion in the present embodiment also removes a resin residue from the die 101 at the same time. In addition, the removal head movement motion is performed with a timing when hanging of the molten resin 103 from the slit 105 is interrupted after extrusion of the molten resin 103 in a sheet shape from the slit 105 (see FIG. 11) in the die 101 of the molding apparatus 100. More specifically, for example, motion of the resin residue removal device 1 is performed with a timing, after closing the molds 104, when an ejection tool (not shown) configured to eject a molded article after closing the molds sandwiches the molten resin 103 protruding above from the molds 104. These motions are preferably performed every time the molds 104 are closed, whereas they may be configured to be performed once in a predetermined number of times or performed in accordance with a user instruction. The cleaning motion is executed continuously after finishing the removal head movement motion. It should be noted that the cleaning motion also does not have to be performed every time the removal head movement motion is finished and may be configured to be performed once in a predetermined number of times or performed in accordance with a user instruction.

Removal Head Movement Motion

As illustrated in FIGS. 17A through 17D, in the resin residue removal device 1 in the present embodiment, the control mechanism 10 controls the moving mechanism 3 to cause the resin residue removal head 7 to move between the lateral position X1 (see FIG. 17A) out of the position immediately below the die 101 and the immediately below position X2 (see FIGS. 17B through 17D) as the position immediately below the die 101. As illustrated in FIGS. 17A, 17B, 18A, and 18B, the control mechanism 10 causes the resin residue removal head 7 in the immediately below position X2 to move between the separate position Z1 (see FIGS. 17A, 17B, and 18A) separate from the lower surface 102 of the die 101 and the close position Z2 (see FIGS. 17C, 17D, and 18B) close to the lower surface 102 by controlling the moving mechanism 3.

It should be noted that, in the resin residue removal device 1 in the present embodiment different from the resin residue removal device 1 in the first embodiment, the plate-shaped member 71 of the resin residue removal head 7 is configured to abut on the die 101 when the support arm 34 pivots to move the resin residue removal head 7 to the close position Z2. The plate-shaped member 71 in the close position Z2 abutting on the die 101 allows a resin residue adhered to the lower surface 102 of the die 101 to be more securely scraped. It is also possible to press the plate-shaped member 71 of the resin residue removal head 7 against the die 101. As described above, the "close position" in the present invention includes, in addition to the case where there is a slight gap between the die 101 and the resin residue removal head 7 (in the first embodiment, the die 101 and the resin residue removal head 4), the case where the gap is 0 mm.

The "immediately below position X2" in the present embodiment refers to a position inside a virtual tube formed by extending the outer edge of the lower surface 102 of the die 101 downward. The resin residue removal head 7 in the immediately below position X2 refers to the center of gravity of the plate-shaped member 71 of the resin residue removal head 7 being in a position inside the tube. A specific description is given below to movement motion of the removal head 7 by the moving mechanism 3.

Figure 17A:
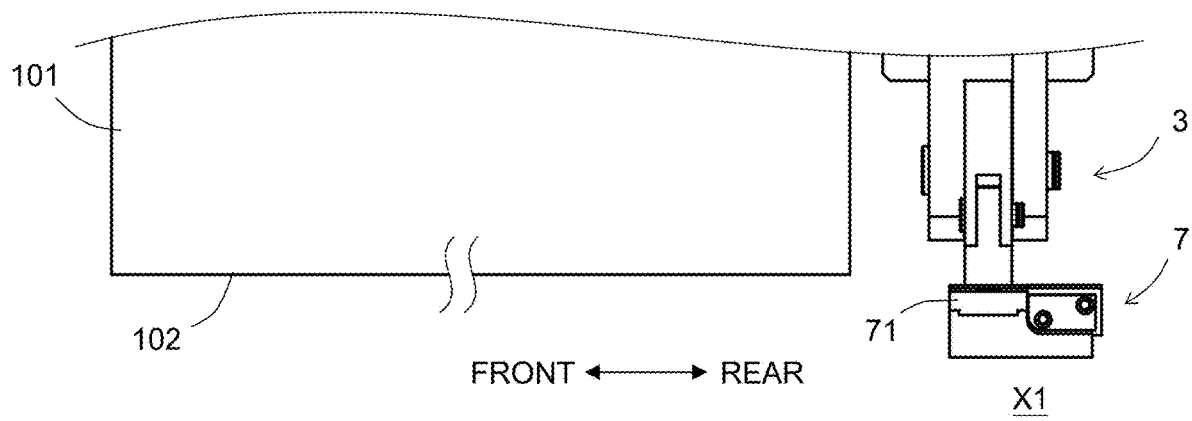
FIGS. 17A through 17D are explanatory diagrams illustrating a situation of the resin residue removal head 4 of the resin residue removal device 1 in FIG. 10 moving along a die 101 of the molding apparatus 100.
Figure 17B:
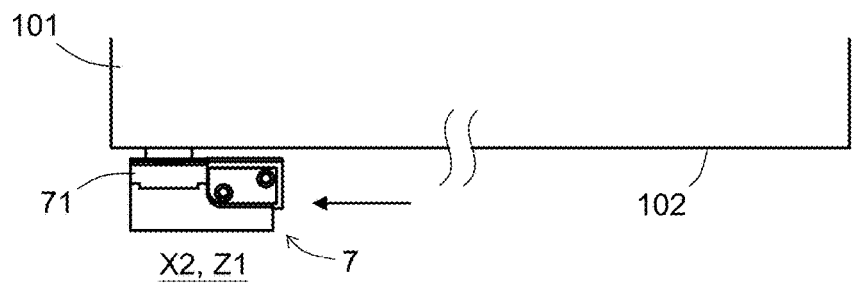
Figure 17C:
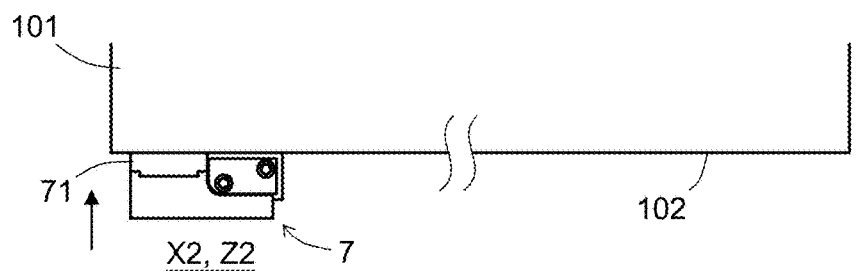
Figure 18A:
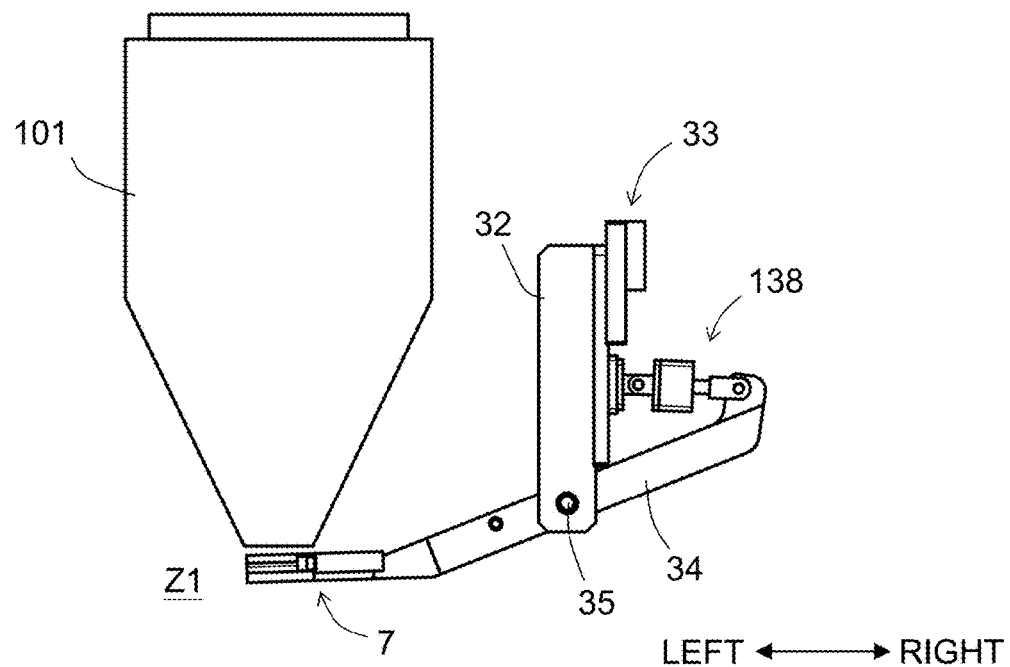
FIG. 18A is a schematic diagram illustrating a situation of the resin residue removal head 4 of the resin residue removal device 1 in FIG. 10 in a lateral position X1 and in the separate position Z1.

While the resin residue removal motion is not performed, as illustrated in FIG. 17A, the resin residue removal device 1 in the present embodiment causes the resin residue removal head 7 to be put aside in the lateral position X1 (position behind the die 101) for standing by in a position without interfering with the molding motion by the molding apparatus 100. It should be noted that, as illustrated in FIG. 18A, the support arm 34 of the moving mechanism 3 in this situation is configured to maintain the distal end portion 34f in the lower state by maintaining the rod portion 138b of the first pneumatic cylinder 138 in the retracted state. Thus, the resin residue removal head 7 is also slightly lower on the distal end side.

To move the resin residue removal head 7 from this situation for removal of a resin residue, the control mechanism 10 causes the rodless cylinder 33 of the moving mechanism 3 to be driven. Specifically, the control mechanism 10 causes the slide block 33a of the rodless cylinder 33 to be slid forward along the guide rail 33b (see FIGS. 11 and 12). Then, in association with sliding of the slide block 33a, the sliding member 32 slides forward along the rail members 31 and the support arm 34 supported by the sliding member 32 moves forward. Then, as illustrated in FIGS. 17A through 17B, the forward movement of the support arm 34 causes the resin residue removal head 7 supported by the distal end portion 34f of the support arm to move from the lateral position X1 to the immediately below position X2. Moreover, as illustrated in FIG. 17B, the control mechanism 10 causes the resin residue removal head 7 to move to a farthest position from the lateral position X1 (see FIG. 17A) in the immediately below position X2 at first.

In this situation, the control mechanism 10 maintains the rod portion 138b of the first pneumatic cylinder 138 in the retracted state while reaching the farthest position from the lateral position X1 in the immediately below position X2 illustrated in FIG. 17B from the lateral position X1 illustrated in FIG. 17A. Thus, the distal end portion 34f of the support arm 34 is maintained in the lower state, and the resin residue removal head 7 is maintained in the separate position Z1 as illustrated in FIGS. 17B and 18A. In short, the resin residue removal device 1 in the present embodiment does not perform removal of a resin residue until the resin residue removal head 7 moves to the farthest position (see FIG. 17B) from the lateral position X1.

Figure 17D:
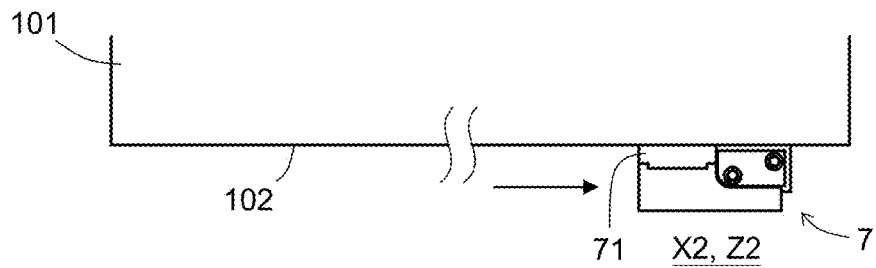
Figure 18B:
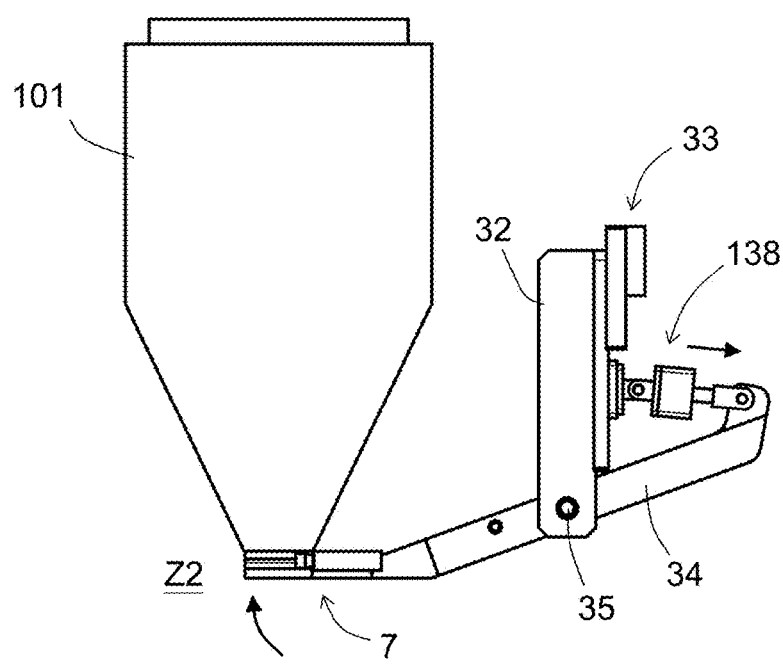
FIG. 18B is a schematic diagram illustrating a situation of the resin residue removal head 4 in the immediately below position X2 and in the close position Z2.

Then, the control mechanism 10 extends the rod portion 138b of the first pneumatic cylinder 138 while the resin residue removal head 7 is in the farthest position (see FIG. 17B) from the lateral position X1. Then, the support arm 34 pivots to lift the distal end portion 34f, and as illustrated in FIGS. 17C and 18B, the resin residue removal head 7 inside the immediately below position X2 moves from the separate position Z1 to the close position Z2. Then, the control mechanism 10 causes the slide block 33a of the rodless cylinder 33 to slide rearward along the guide rail 33b (see FIGS. 17C through 17D) while the resin residue removal head 7 is maintained in the close position Z2. Thus, the resin residue removal head 7 moves toward the lateral position X1 along the slit 105, and a resin residue adhered near the slit 105 is scraped by the removal edge 71b of the plate-shaped member 71. It should be noted that part of the scraped resin residue adheres to the plate-shaped member 71 and that dropped from the plate-shaped member 71 is held on the residue receiver section 70b.

Sliding of the slide block 33a of the rodless cylinder 33 of the moving mechanism 3 along the guide rail 33b further rearward from the state of FIG. 17D causes the resin residue removal head 7 to move from the immediately below position X2 to the lateral position X1. During this movement, when the removal edge 71b of the plate-shaped member 71 reaches the rear end of the slit 105, the control mechanism 10 causes the rod portion 138b of the first pneumatic cylinder 138 to be retracted. Thus, the resin residue removal head 7 moves from the close position Z2 (see FIG. 18B) to the separate position Z1 (see FIG. 18A) before the resin residue removal head 7 reaches a position closest to the lateral position X1 in the immediately below position X2. Then, the resin residue removal head 7 moves from the immediately below position X2 to the lateral position X1 while being in the separate position Z1.

Figure 19:
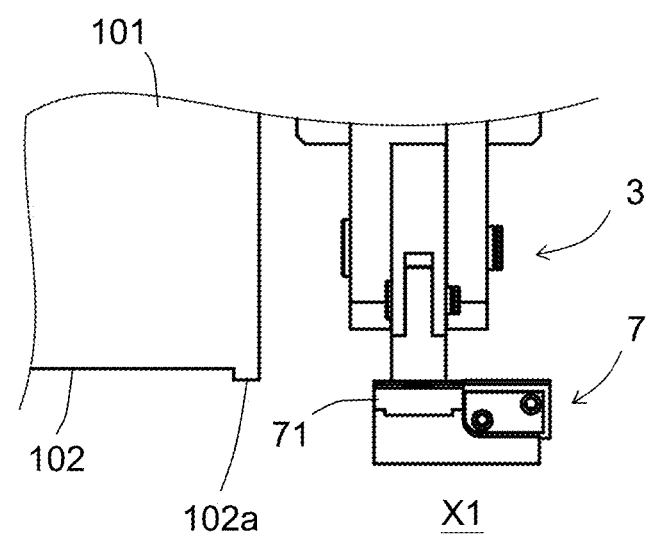
FIG. 19 is an explanatory diagram illustrating a situation where a projecting section 102a is on a rear edge of a lower surface 102 of the die 101.

As illustrated in FIG. 19, even when there is a slightly projecting section 102a on the rear edge of the lower surface 102 of the die 101 for example, the above-described movement of the resin residue removal head 7 in the separate position Z1 from the immediately below position X2 to the lateral position X1 allows, prevention of interference of the resin residue removal head 7 with the projecting section 102a.

As described above, the moving mechanism 3 in the present embodiment is configured to cause the resin residue removal head 7 to move between the lateral position X1 and the immediately below position X2 by moving the support arm 34 in the forward and backward directions (moving the support arm horizontally) to the support frames 2. The moving mechanism 3 is also configured to cause the resin residue removal head 7 to move between the separate position Z1 and the close position Z2 by seesaw pivoting of the support arm 34.

Resin Residue Cleaning Motion

In the resin residue removal device 1 in the present embodiment, the control mechanism 10 executes the resin residue cleaning motion after the removal head movement motion is finished by controlling the second pneumatic cylinder 52, the first air blowing mechanism 54, and the second air blowing mechanism 55 of the cleaning mechanism 5.

Specifically, as illustrated in FIGS. 20A through 20B and FIGS. 21A through 21B, the control mechanism 10 causes the second pneumatic cylinder 52 to be driven to extend the rod 52b while the resin residue removal head 7 is in the lateral position X1 to move the cleaning member 53 attached to the distal end of the rod 52b in the left direction. At the same time, the control mechanism 10 causes the first air blowing mechanism 54 to operate to blow compressed air to the plate-shaped member 71 and the cleaning member 53 from the right side via the nozzles 54a. Moreover, the control mechanism 10 causes the second air blowing mechanism 55 to operate to blow compressed air rearward via the nozzles 55a in a position on the left side of the resin residue removal head 7.

Such a motion causes the resin residue R adhered to the plate-shaped member 71 of the resin residue removal head 7 and the resin residue R collected on the residue receiver section 70b to come off by the cleaning member 53 and the compressed air blown from the nozzles 54a of the first air blowing mechanism 54 and blown to the left. The plate-shaped member 71 and the residue receiver section 70b are thus cleaned. It should be noted that, in the present embodiment as illustrated in FIGS. 14 and 15, the smooth connection between the residue receiver section 70b and the vertical surface 70c of the base member 70 and the curved shape of the side where the rear surface and the lower surface of the cleaning member 53 meet allow suppressing the resin residue R to obstruct between the residue receiver section 70b and the cleaning member 53.

The resin residue R blown by the cleaning member 53 and the compressed air from the nozzles 54a of the first air blowing mechanism 54 is then blown rearward (see FIG. 21B) by the compressed air from the nozzles 55a of the second air blowing mechanism 55. Blowing of the resin residue R rearward, that is, to the opposite side to the die 101 allows prevention of adherence of the resin residue R to the molds 104 arranged below the die 101 and the like. It should be noted that the resin residue R thus removed and collected may be ground by, for example, a grinder for reuse.

It should be noted that the compressed air blown from the nozzles 54a of the first air blowing mechanism 54 also has an effect as a cooling mechanism to cool the plate-shaped member 71 of the resin residue removal head 7. Cooling of the plate-shaped member 71 allows reduction in the viscosity of the adhered resin residue R and facilitates the resin residue R to come off.

2.3 Action and Effects

As described above, the resin residue removal device 1 according to the present embodiment allows the resin residue removal head 7 to move between the lateral position X1 and the immediately below position X2 by moving the support arm 34 in the forward and backward directions (horizontally) by driving of the rodless cylinder 33 and also causes the resin residue removal head 7 to move between the separate position Z1 and the close position Z2 by pivoting the support arm 34 by driving of the first pneumatic cylinder 138. In addition, the pivoting motion performed after moving the resin residue removal head 7 to the immediately below position X2 allows prevention of interference of the resin residue removal head 7 with the die 101 while the resin residue removal head 7 is moved from the lateral position X1 to the immediately below position X2.

Still in addition, the resin residue removal device 1 in the present embodiment is configured to move the resin residue removal head 7 from the separate position Z1 to the close position Z2 after the control mechanism 10 causes the resin residue removal head 7 to move to the farthest position (see FIG. 17B) from the lateral position X1. This allows a resin residue gradually seeping from the slit 105 to be removed immediately before the next molding motion by the molding apparatus 100 and thus allows preferable suppression of adherence of a resin residue to a molded resin article.

In addition, the resin residue removal device 1 in the present embodiment including the cleaning mechanism 5 configured to clean a resin residue adhered to the resin residue removal head 7 allows maintenance of the resin residue removal performance for continuous use of the resin residue removal device 1.

2.4 Modifications

The invention according to the present embodiment may also be carried out in modes described below.

Modification 2-1

Figure 22:
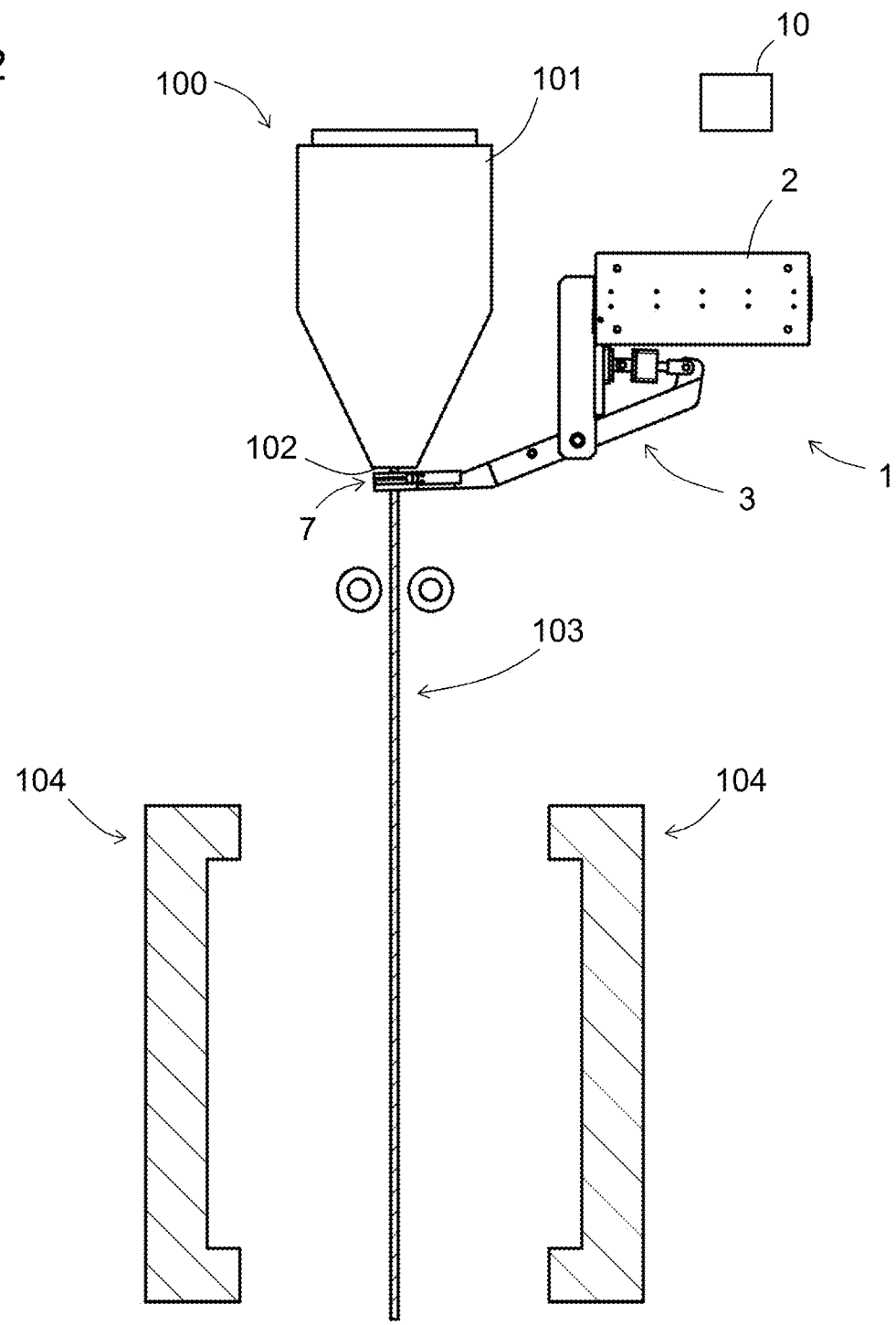
FIG. 22 is a side view illustrating positional relationship between a resin residue removal device 1 according to Modification 2-1 of the second embodiment of the present invention and a molding apparatus 100 that removes a resin residue using the device 1.

In the embodiment described above, the pair of molding apparatuses 100 using the resin residue removal devices 1 are configured to be arranged to hang the pair of molten resins 103 (resin sheets) in parallel to the set of molds 104. However, as illustrated in FIG. 22, the resin residue removal device 1 according to the present embodiment may also be used for only one molding apparatus 100 arranged to the set of molds 104.

Modification 2-2

Figure 23:
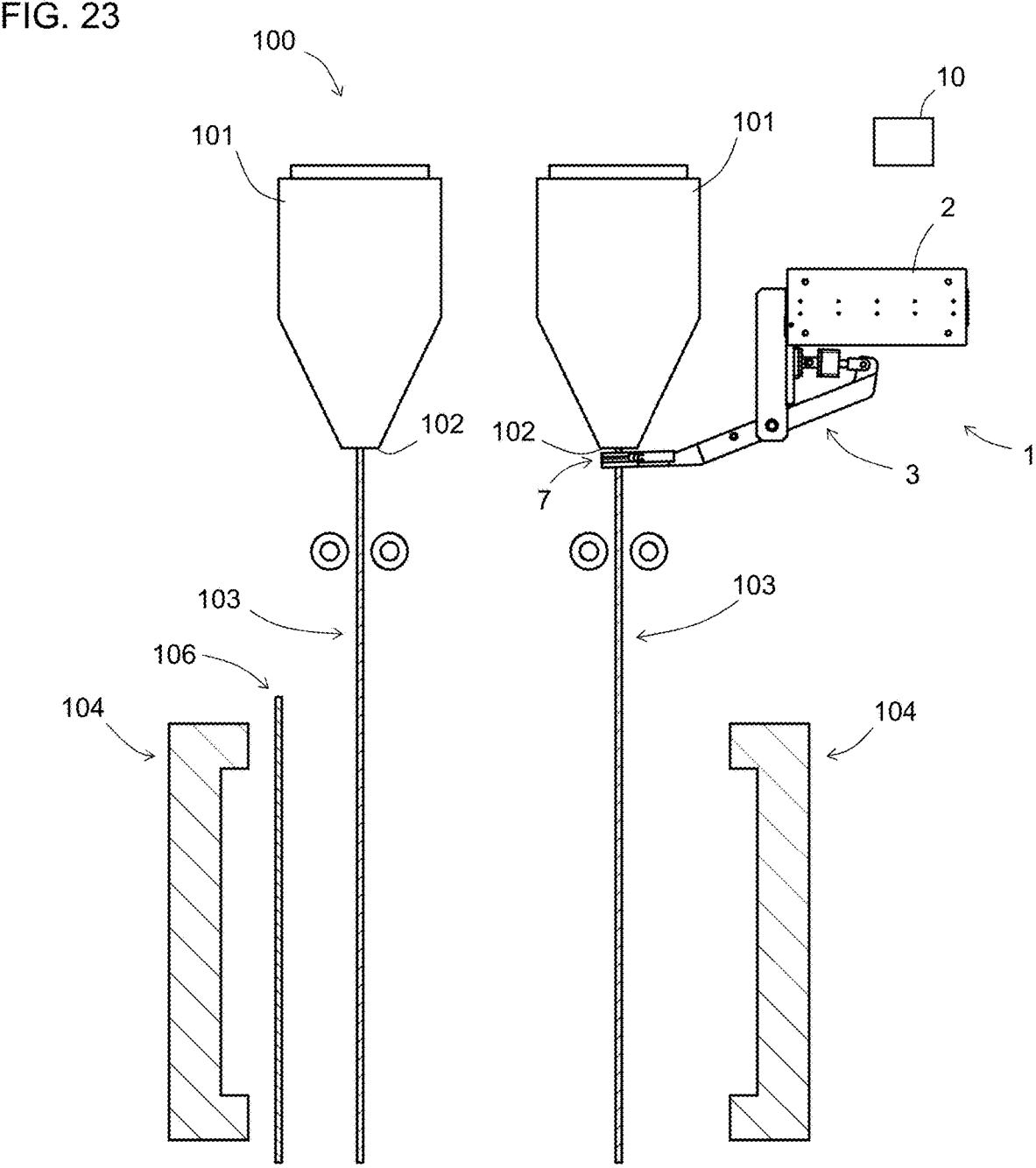
FIG. 23 is an explanatory diagram illustrating motion of a resin residue removal device 1 according to Modification 2-2 of the second embodiment of the present invention.

In addition, in the pair of molding apparatuses 100 as in the above embodiment arranged to hang the pair of molten resins 103 in parallel to the set of molds 104, the resin residue removal device 1 may also be used only for one molding apparatus 100. For example, as illustrated in FIG. 23, in such a case where an outer layer material 106 (e.g., carpet material) is arranged between the molten resin 103 hanging from one of the molding apparatuses 100 (molding apparatus 100 on the left in FIG. 23) and the mold 104, even a resin residue adhered to the molten resin 103 does not affect the appearance of a final resin molded article because the resin residue is covered with the outer layer material 106. Accordingly, it is also preferred to arrange the resin residue removal device 1 only to the molding apparatus 100 on the side not to arrange the outer layer material 106.

Other Modifications

In the above embodiment, the resin residue removal head 7 is moved from the separate position Z1 to the close position Z2 for removing a resin residue after the control mechanism 10 causes the resin residue removal head 7 to move to the farthest position (see FIG. 17B) from the lateral position X1. However, the resin residue removal head 7 may also be moved to the close position Z2 for removing a resin residue while the resin residue removal head 7 is moved from the lateral position X1 (i.e., position to be put aside while the resin residue removal motion is not performed) to the farthest position from the lateral position X1.

In the above embodiment, the plate-shaped member 71 of the resin residue removal head 7 is cooled by blowing the compressed air from the nozzles 54a of the first air blowing mechanism 54 of the cleaning mechanism 5. However, a water cooling mechanism may also be provided to cool the plate-shaped member 71 with water.

REFERENCE SIGNS LIST

1: Resin Residue Removal Device, 2: Support Frame, 3: Moving Mechanism, 4: Resin Residue Removal Head, 5: Cleaning Mechanism, 6: Extension Drive Mechanism, 7: Resin Residue Removal Head, 10: Control Mechanism, 21: U-Shaped Frame, 21a: Upper Frame, 21b: Rear Frame, 21c: Lower Frame, 22: Side Frame, 23: Roller (Pressing Section), 31: Rail Member (Guide Mechanism), 32: Sliding Member, 32a: Upper Plate Portion, 32b: Rear Plate Portion, 32c: Lower Plate Portion, 32d: Connection Plate, 32d1: Attachment Base, 32e: Arm Support Plate, 33: Rodless Cylinder (Linear Drive Mechanism), 33a: Slide Block, 33b: Guide Rail (Guide Member), 34: Support Arm, 34a: Front End Area, 34b: Front End Side Cover, 34c: Rear End Side Cover, 34d: Rear End Area, 34e: Body Portion, 34f: Distal End Portion, 34g: Base End Portion, 35: Support Shaft, 36: Guide Block, 37: Pivoting Restriction Portion, 38: Cam (To-Be-Pressed Section), 38a: Tilted Surface, 39: Rotating Shaft, 41: Rotating Plate, 41a: Shaft, 41b: Attachment Member, 41b1: Attachment Surface, 41c: Bolt, 42: Columnar Member (Resin Residue Removal Member), 42a: Facing Surface, 42b: Enlarged Diameter Portion, 43: Removal Drive Mechanism, 44: Rotating Shaft, 45: Front End Side Pulley, 46: Rear End Side Pulley, 47: Chain, 48: Rodless Cylinder, 48a: Support Plate, 48b: Slide Block, 48c: Guide Rail, 49: Rotating Shaft, 51: Scraper, 52: Second Pneumatic Cylinder (Back-and-forth movement Cleaning Mechanism), 52a: Cylinder, 52b: Rod, 53: Cleaning Member, 54: First Air Blowing Mechanism (Cooling Mechanism), 54a: Nozzle, 55: Second Air Blowing Mechanism, 55a: Nozzle, 55b: Nozzle Support Frame, 60: Rotating Shaft, 61: Rotating Shaft, 70: Base Member, 70a: Upper Surface, 70b: Residue Receiver Section, 70c: Vertical Surface, 71: Plate-Shaped Member (Resin Residue Removal Member), 71a: Facing Surface, 71b: Removal Edge, 100: Molding Apparatus, 101: Die (T Die), 102: Lower Surface, 102a: Projecting Section, 103: Molten Resin (Parison, Resin Sheet), 104: Mold, 105: Slit, 106: Outer Layer Material, 131: Guide Mechanism, 133b: Guide Member, 138: First Pneumatic Cylinder (Pivot Drive Mechanism), 138a: Cylinder Portion, 138a1: One-End Side Attachment Section, 138b: Rod Portion, 138b1:

Another-End Side Attachment Section, 142: Removal Blade, 142*a*: Facing Surface, 142*b*: Cutting Edge Portion, 142*c*: To-Be-Attached Surface, R: Resin Residue, X1: Lateral Position, X2: Immediately Below Position, Z1: Separate Position, Z2: Close Position.

The invention claimed is:

1. A resin residue removal device for removing a resin residue adhered to a lower surface of a die of a molding apparatus, the device comprising a moving mechanism and a resin residue removal head, wherein
the moving mechanism includes: a support arm; a guide mechanism; a sliding member; and a linear drive mechanism,
the support arm supports the resin residue removal head on a distal end side of the arm and is supported by the sliding member,
the moving mechanism is configured to move the resin residue removal head between a lateral position out of a position immediately below the die and an immediately below position as the position immediately below by sliding the sliding member along the guide mechanism by driving of the linear drive mechanism, and also in the immediately below position, to move the head between a separate position separate from the lower surface and a close position close to the lower surface,
the resin residue removal head is configured to allow removal of the resin residue adhered to the lower surface by moving along the lower surface, and
the moving mechanism includes at least one configuration of (1) or (2) below:
(1) a configuration in which horizontal movement of the support arm causes the resin residue removal head to move between the lateral position and the immediately below position; or
(2) a configuration in which seesaw pivoting of the support arm causes the resin residue removal head to move between the separate position and the close position.

2. The resin residue removal device according to claim 1, wherein
the guide mechanism extends to the die in the lateral position, and
sliding of the sliding member along the guide mechanism by driving of the linear drive mechanism causes the support arm to move forward and backward and the resin residue removal head to move between the immediately below position and the lateral position.

3. The resin residue removal device according to claim 2, wherein
the sliding member includes: a support shaft pivotally supporting the support arm; and a pressing section configured to press the support arm,
the support arm includes a to-be-pressed section in a position opposite to the resin residue removal head across the support shaft, and
when the support arm moves forward in association with sliding of the sliding member, a downward press of the to-be-pressed section from above by the pressing section causes the support arm to seesaw pivot about the support shaft.

4. The resin residue removal device according to claim 3, wherein
the pressing section is a roller placed in a support frame supporting the guide mechanism,
the to-be-pressed section is a cam having an upper surface tilted upward toward a rear end side of the support arm, and
the forward movement of the support arm in association with sliding of the sliding member causes the roller to abut on the upper surface and to press the cam downward from above.

5. The resin residue removal device according to claim 1, wherein
the molding apparatus is configured to extrude a resin sheet in a sheet shape and has the die formed with a linear slit capable of extruding the resin sheet on the lower surface,
the guide mechanism is arranged along a longitudinal direction of the slit, and
the sliding of the sliding member along the guide mechanism by the driving of the linear drive mechanism causes the support arm to slide and the resin residue removal head to move between the lateral position and the immediately below position and to further move along the slit.

6. The resin residue removal device according to claim 5, wherein
the sliding member includes a support shaft pivotally supporting the support arm, and
the moving mechanism includes a pivot drive mechanism causes the support arm to seesaw pivot about the support shaft.

7. The resin residue removal device according to claim 6, further comprising a control mechanism configured to control the moving mechanism, wherein
the control mechanism causes the resin residue removal head to move to a farthest position from the lateral position in the immediately below position by the linear drive mechanism while the resin residue removal head is in the separate position, then causes the resin residue removal head to move to the close position by pivoting the support arm by the pivot drive mechanism, and then causes the resin residue removal head to move to the lateral position along the slit by the linear drive mechanism while the resin residue removal head is in the close position.

8. A resin residue removal device for removing a resin residue adhered to a lower surface of a die of a molding apparatus, the device comprising a moving mechanism and a resin residue removal head, wherein
the moving mechanism is configured to move the resin residue removal head between a lateral position out of a position immediately below the die and an immediately below position as the position immediately below, and also in the immediately below position, to move the head between a separate position separate from the lower surface and a close position close to the lower surface,
the resin residue removal head is configured to allow removal of the resin residue adhered to the lower surface by moving along the lower surface, and
the molding apparatus is configured to extrude a cylindrical parison and has the die formed with an annular slit capable of extruding the cylindrical parison on the lower surface,
the resin residue removal head includes a resin residue removal member and a removal drive mechanism,
the resin residue removal member has a facing surface facing the lower surface, and
by driving of the removal drive mechanism, the resin residue removal member rotates to allow the facing surface to move along the slit.

9. The resin residue removal device according to claim 8, wherein the resin residue removal member is a columnar member turnably supported.

10. The resin residue removal device according to claim 8, wherein
the resin residue removal member is a removal blade having a cutting edge portion in a direction of the rotation.

11. A resin residue removal device for removing a resin residue adhered to a lower surface of a die of a molding apparatus, the device comprising a moving mechanism and a resin residue removal head, wherein
the moving mechanism is configured to move the resin residue removal head between a lateral position out of a position immediately below the die and an immediately below position as the position immediately below, and also in the immediately below position, to move the head between a separate position separate from the lower surface and a close position close to the lower surface,
the resin residue removal head is configured to allow removal of the resin residue adhered to the lower surface by moving along the lower surface, and the resin residue removal device, further comprising
a cleaning mechanism configured to clean the resin residue adhered to the resin residue removal head.

12. The resin residue removal device according to claim 11, wherein
the cleaning mechanism includes a cooling mechanism configured to cool the resin residue removal head.

13. The resin residue removal device according to claim 11, wherein
the cleaning mechanism is a scraper configured to scrape the resin residue adhered to the resin residue removal head when the resin residue removal head moves to the lateral position.

14. The resin residue removal device according to claim 11, wherein
the cleaning mechanism includes: a cleaning member configured to scrape the resin residue adhered to the resin residue removal head by moving along the resin residue removal head; and an air blowing mechanism configured to blow air to the cleaning member.

* * * * *